(12) United States Patent
Broecher et al.

(10) Patent No.: US 8,609,757 B2
(45) Date of Patent: Dec. 17, 2013

(54) CATIONIC CROSS-LINKED POLYMERS IN WATER-IN-WATER POLYMER DISPERSIONS

(75) Inventors: Markus Broecher, Muelheim an der Ruhr (DE); Charlotta Kanto Oeqvist, Kempen (DE); Nathalie Sieverling, Duisburg (DE); Christian Boekelo, Krefeld (DE)

(73) Assignee: Ashland Licensing and Intellectual Property LLC, Dublin, OH (US)

( * ) Notice: Subject to any disclaimer, the term of this patent is extended or adjusted under 35 U.S.C. 154(b) by 0 days.

(21) Appl. No.: 13/399,300

(22) Filed: Feb. 17, 2012

(65) Prior Publication Data

US 2012/0202941 A1    Aug. 9, 2012

Related U.S. Application Data

(63) Continuation of application No. PCT/EP2010/005163, filed on Aug. 24, 2010.

(30) Foreign Application Priority Data

Aug. 24, 2009  (EP) .................................... 09010798

(51) Int. Cl.
  *C08L 33/26*  (2006.01)
  *C08F 220/56*  (2006.01)

(52) U.S. Cl.
  USPC ................ 524/457; 526/78; 526/89; 526/173

(58) Field of Classification Search
  USPC ............................. 524/457; 526/78, 89, 173
  See application file for complete search history.

(56) References Cited

U.S. PATENT DOCUMENTS 5,840,804 A * 11/1998 Carl et al. ..................... 524/555

OTHER PUBLICATIONS

U.S. Appl. No. 13/399,269, filed Feb. 17, 2012, Broecher, et al.

\* cited by examiner

*Primary Examiner* — Kelechi Egwim
(74) *Attorney, Agent, or Firm* — Oblon, Spivak, McClelland, Maier & Neustadt, L.L.P.

(57) ABSTRACT

The invention relates to water-in-water polymer dispersions containing cross-linked cationic polymers, methods for their preparation and their use. The water-in-water polymer dispersions are useful inter alia as flocculants, dewatering (drainage) aids and retention aids in papermaking.

30 Claims, 4 Drawing Sheets

CATIONIC CROSS-LINKED POLYMERS IN WATER-IN-WATER POLYMER DISPERSIONS

FIELD OF THE INVENTION

The invention relates to water-in-water polymer dispersions containing cross-linked cationic polymers, methods for their preparation and their use. The water-in-water polymer dispersions are useful inter alia as flocculants, dewatering (drainage) aids and retention aids in papermaking.

BACKGROUND ART

In the manufacture of paper, a papermaking furnish, i.e. an aqueous slurry of cellulosic fiber having a water content of usually more than 95 wt.-% is formed into a paper sheet typically having a water content of less than 5 wt.-%. Hence, the dewatering (drainage) and retention aspects of papermaking are important to the efficiency and cost of the manufacture. Typically, a cellulosic thin stock is drained on a moving screen to form a sheet which is then dried. It is well known to apply water soluble polymers to the cellulosic suspension in order to effect flocculation of the cellulosic solids and enhance drainage on the moving screen. According to a well known method for papermaking, a cellulosic suspension is formed, flocculated by means of a flocculant, mechanically sheared, optionally re-flocculated by means of a re-flocculant, drained on a screen to form a sheet and then dried.

DE-A 44 06 624 discloses low viscous, cross-linked aqueous polymer dispersions that are prepared by polymerizing a water-soluble monomer, optionally a hydrophobic monomer and a cross-linker in the presence of a polymeric dispersant. The dispersions are useful as thickeners, flocculants and retention aids.

DE-A 195 32 229 discloses cross-linkable and cross-linked aqueous polymer dispersions that are prepared by polymerizing a water-soluble monomer, a cross-linkable N-methylol-compound, optionally a cross-linker and optionally a hydrophobic monomer in the presence of a polymeric dispersant. The polymer dispersions are useful as thickeners, flocculation aids, retention aids in papermaking, and adhesives, particularly as wallpaper coatings.

U.S. Pat. No. 5,840,804 discloses a method of producing low-viscosity water-based water-soluble polymer dispersions having a high concentration of the principal substance comprising polymerizing the following monomer components: (a1) 50-99.999 wt. % of at least one water-soluble monomer; (a2) 0.001-1 wt. % of at least one cross-linking monomer with at least two ethylenically unsaturated radically polymerizable groups; (a3) 0-30 wt. %, particularly 1-25 wt. %, of at least one hydrophobic monomer; and (a4) 0-25 wt. %, particularly 0.1-15 wt. %, of at least one amphiphilic monomer, in aqueous solution, in the presence of at least one polymer dispersant, to form a polymer (A), where the sum of the amounts of the components represented by the monomers (a1), (a2), (a3), and (a4) is 100 wt. % of the monomers, the weight average molecular weight of the resulting polymer (A) is at least 500,000 Dalton, and polymer (A) is incompatible with the dispersant.

The properties of the polymer dispersions of the prior art are, however, not satisfactory in every respect.

SUMMARY OF THE INVENTION

A first aspect of the invention relates to a method for manufacturing a water-in-water polymer dispersion which comprises subjecting an aqueous reaction mixture comprising (i) a cationic polymeric dispersant and
(ii) a monomer composition comprising
   a) at least 5 wt.-%, preferably at least 20 wt.-% of a non-ionic monomer according to general formula (I)

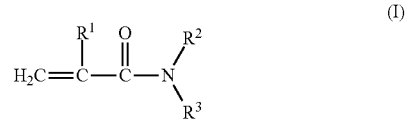

wherein
   $R^1$ means hydrogen or $C_1$-$C_3$-alkyl; and
   $R^2$ and $R^3$ mean, independently of each other, hydrogen, $C_1$-$C_5$-alkyl or $C_1$-$C_5$-hydroxyalkyl;
   based on the total weight of monomers;
b) at least 5 wt.-%, preferably at least 20 wt.-%, preferably 20 to 47 wt.-% or 50.5 to 80 wt.-%, of a cationic monomer according to general formula (II)

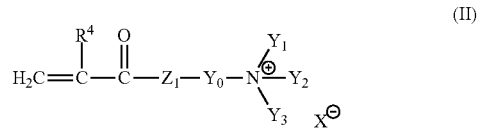

wherein
   $R^4$ means hydrogen or $C_1$-$C_3$-alkyl;
   $Z_1$ means O or $NR^5$ with $R^5$ being hydrogen or $C_1$-$C_3$-alkyl;
   $Y_0$ means $C_2$-$C_6$-alkylene, optionally substituted with one or more hydroxy groups;
   $Y_1, Y_2, Y_3$, independently of each other, mean $C_1$-$C_6$-alkyl; and
   $X^-$ means halogen, pseudo-halogen, acetate, or $SO_4CH_3^-$;
   based on the total weight of monomers;
c) 0.0001 to 1.25 wt.-% of one or more preferably ethylenically unsaturated cross-linkers, based on the total weight of monomers;
d) 0 to 1.25 wt.-% of one or more hydrophobic (meth) acrylic acid $C_{4-18}$-alkyl esters, based on the total weight of monomers; and
e) optionally, further ethylenically unsaturated monomers;
to a free radical polymerization reaction such that the resulting water-in-water polymer dispersion contains a cross-linked cationic copolymer. Said cross-linked cationic copolymer is preferably water-soluble or water-swellable.

It has been surprisingly found that the water-in-water polymer dispersions thus obtained have improved properties, particularly under shear conditions, with respect to dewatering of mud, paper retention and ash retention.

The in situ copolymerization of the non-ionic monomer according to general formula (I), the cationic monomer according to general formula (II), and the one or more preferably ethylenically unsaturated cross-linkers in the aqueous reaction mixture in the presence of the cationic polymeric dispersant yields a water-in-water polymer dispersion wherein the resultant cross-linked cationic copolymer is intercalated in the cationic polymeric dispersant thereby forming an interpenetrating complex.

Water-in-water polymer dispersions of this type are not obtainable by polymerizing the monomers in absence of the cationic polymeric dispersant and adding the cationic polymeric dispersant thereafter, but require the presence of the cationic polymeric dispersant during the polymerization reaction in situ. Otherwise, different products exhibiting different properties are obtained. In particular, when adding an aqueous dispersion of a cationic polymeric dispersant to a water-in-water polymer dispersion that has been obtained separately by polymerizing the non-ionic monomer according to general formula (I), the cationic monomer according to general formula (II), and the one or more preferably ethylenically unsaturated cross-linkers, a gel block would be obtained that could not be properly handled any further. Depending on the total concentration of the monomers, it would practically be impossible to homogeneously distribute the cationic polymeric dispersant in the water phase of the water-in-water polymer dispersion in order to form an interpenetrating complex. Further, when trying to subsequently introduce the cationic polymeric dispersant in form of an aqueous solution, the water content thereof would dilute the overall composition.

DETAILED DESCRIPTION OF THE INVENTION

Figure 1:
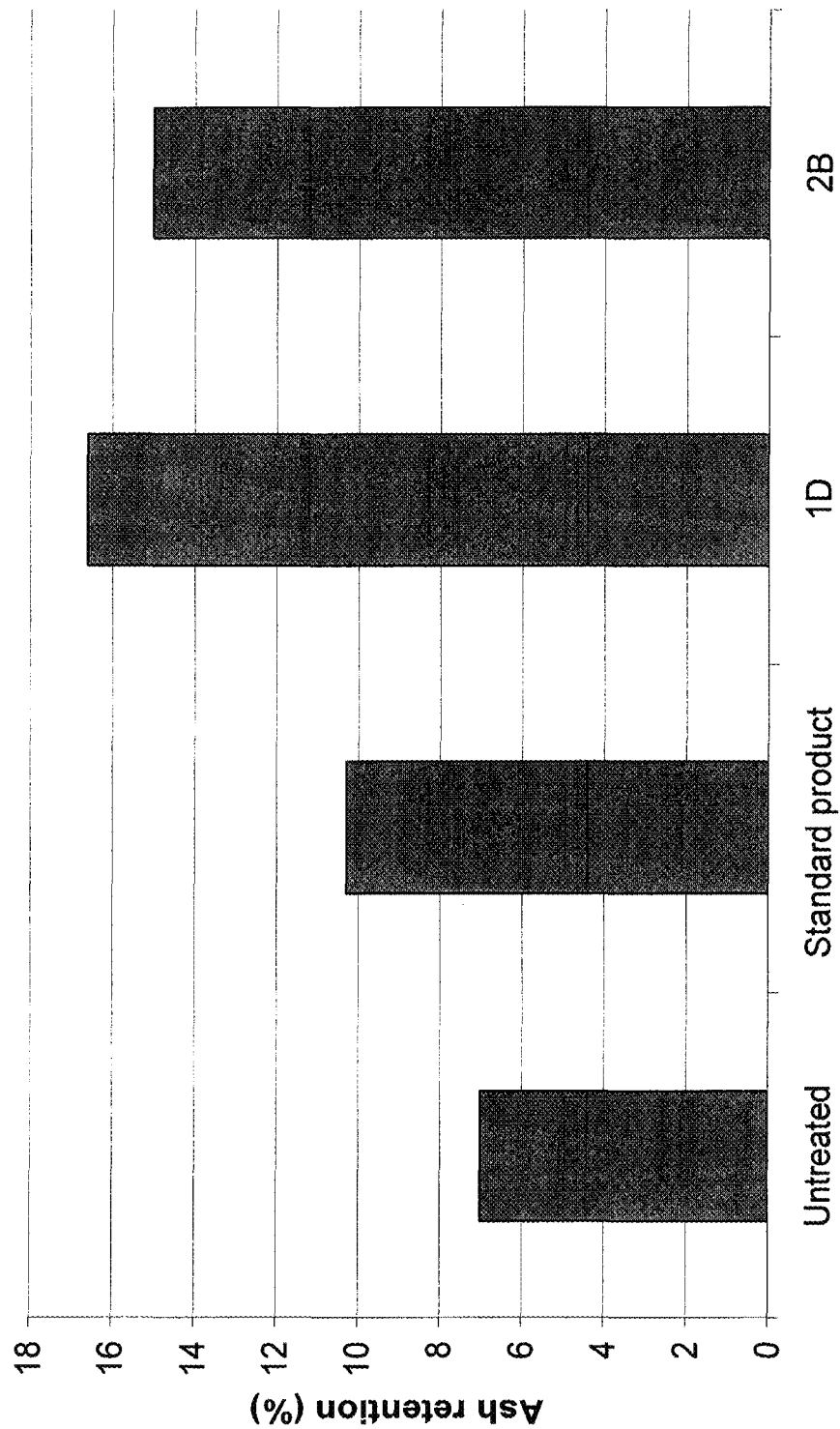
FIG. 1 shows the effect of the polymer dispersions according to the invention on the ash retention in an eucalyptus furnish.

Water-in-water polymer dispersions are well known in the art. In this regard it can be referred to, e.g., H. Xu et al., Drug Dev Ind Pharm., 2001, 27(2), pp 171-4; K. A. Simon et al., Lang-muir., 2007, 30; 23(3), 1453-8; P. Hongsprabhas, International Journal of Food Science & Technology, 2007, 42(6), 658-668; D. Gudlauski, PaperAge, May/June 2005, pp 36 f, US-A 2004 0034145, US-A 2004 0046158, US-A 2005 0242045, and US-A 2007 0203290.

The standard emulsion found in the water treatment industry, however, is a water-in-oil inverse emulsion, i.e. the polymer is located in microscopic water droplets emulsified in an oil medium. In fact, the water in the droplets is not considered free since the polymer restrains it and the product is more like a dispersion of a gel in oil. A water-in-water dispersion is based on a different principle involving a polymer precipitation in water, preferably in an aqueous salt solution, e.g. brine. The final product obtained is a stable dispersion of microscopic polymer particles in water. These dispersions are solvent free, making this range of products environmentally friendly.

For the purpose of the specification the term "water-in-water polymer dispersion" refers to an aqueous system containing a water-soluble or water-swellable cross-linked cationic copolymer and a cationic polymeric dispersant, where the water-soluble or water swellable cross-linked cationic copolymer has been obtained by in situ polymerization of suitable monomers in the presence of said cationic polymeric dispersant.

The cationic polymeric dispersant as well as the water-soluble or water swellable cross-linked cationic copolymer can serve as coagulant and/or flocculant. Chemical coagulation, the alteration of suspended and colloidal particles so they adhere to each other, is one type of chemical treatment process. Coagulation is a process that causes the neutralization of charges or a reduction of the repulsion forces between particles. Flocculation is the aggregation of particles into larger agglomerations ("flocs"). Coagulation is virtually instantaneous, while flocculation requires some time for the flocs to develop. For the purpose of the specification, the term "cationic polymeric dispersant" preferably refers to a water-soluble or water-dispersible, preferably highly ionic, polymer of comparatively low molecular weight. When the overall electrical charge associated with particles and organic matter in water is negative, e.g. the cellulosic fiber suspension processed in papermaking, positively charged dispersants are preferably added to neutralize the electrical charge.

For the purpose of the specification, the term "water-soluble", particularly when it relates to the water-solubility of monomers, preferably refers to a solubility in pure water at ambient temperature of at least $10$ g $l^{-1}$, more preferably at least $25$ g $l^{-1}$, still more preferably at least $50$ g $l^{-1}$, yet more preferably at least $100$ g $l^{-1}$, most preferably at least $250$ g $l^{-1}$ and in particular at least $500$ g $l^{-1}$. For the purpose of the specification, the term "water-soluble", particularly when it relates to the water-solubility of polymers, preferably refers to a solubility in pure water at ambient temperature of at least $1.0$ g $l^{-1}$, more preferably at least $2.5$ g $l^{-1}$, still more preferably at least $5.0$ g $l^{-1}$, yet more preferably at least $10.0$ g $l^{-1}$, most preferably at least $25.0$ g $l^{-1}$ and in particular at least $50.0$ g $l^{-1}$.

For the purpose of the specification, the term "water-swellable" preferably means that the polymer, while not water-soluble, absorbs an appreciable amount of water. Typically, the weight of the polymer increases by at least 2 wt.-%, preferably at least 5 wt.-%, after being immersed in water at room temperature, e.g., 25° C., for 1 hour, more preferably by about 60 to about 100 times its dry weight.

For the purpose of the specification, the term "cross-linked cationic copolymer" refers to the copolymer that is obtainable by an in situ polymerization reaction wherein a monomer composition comprising at least 5 wt.-%, preferably at least 20 wt.-% of a non-ionic monomer according to general formula (I), b) at least 5 wt.-%, preferably at least 20 wt.-% of a cationic monomer according to general formula (II), c) 0.0001 to 1.25 wt.-% of one or more preferably ethylenically unsaturated cross-linkers, d) 0 to 1.25 wt.-% of one or more hydrophobic (meth)acrylic acid $C_{4-18}$-alkyl esters, and e) optionally, further ethylenically unsaturated monomers, is radically polymerized in the presence of a cationic polymeric dispersant.

It should be emphasized that the presence of the cationic polymeric dispersant during the radical polymerization is essential for the properties of the resultant water-in-water polymer dispersion. Identical water-in-water polymer dispersions are not obtainable by polymerizing the monomers in absence of the cationic polymeric dispersant and adding the cationic polymeric dispersant thereafter. The cationic polymeric dispersant is part of a water-in-water dispersion into which the cross-linked cationic copolymer is polymerized from the monomers. In other words, the cross-linked cationic copolymer obtained by the polymerization reaction is somehow embedded in the cationic polymeric dispersant which is initially present.

The internal structure of the resulting interpenetrating polymer system of the cationic polymeric dispersant and the cross-linked cationic copolymer, however, may not be reproduced by simply mixing a cationic polymeric dispersant and a polymer separately obtained from the same monomers as the cross-linked cationic copolymer.

For the purpose of the specification, the term "(alk)acrylate" shall refer to alkacrylate as well as acrylate. In analogy, the term "(meth)acrylate" shall refer to methacrylate as well as acrylate.

For the purpose of the specification, the term "homopolymer" shall refer to a polymer obtained by polymerization of substantially a single type of monomer, whereas the term "copolymer" shall refer to a polymer obtained by polymerization of two, three, four or more different types of monomers (co-monomers).

For the purpose of the specification, "alkyl" shall mean any saturated linear, branched and/or cyclic hydrocarbon having a single binding partner, such as methyl, ethyl, n-propyl, iso-propyl, n-butyl, iso-butyl, sec-butyl, tert-butyl, pentyl, hexyl, heptyl, octyl, nonyl, decyl, isodecyl, undecyl, dodecyl, tridecyl, tetradecyl, pentadecyl, hexadecyl, heptadecyl, octadecyl, nonadecyl, eicosyl, 2-ethyl-hexyl, cyclopropyl, cyclobutyl, cyclopentyl, cyclohexyl, cycloheptyl, cyclooctyl, methylcyclohexyl, methylcyclopentylethenyl, adamantyl, and the like.

For the purpose of the specification, the term "alkylene" shall mean any saturated linear, branched and/or cyclic hydrocarbon having two binding partners, such as —$CH_2CH_2$—, —$CH_2CH_2CH_2$— and —$CH_2CH(CH_3)CH_2$—.

According to the method of the invention an aqueous reaction mixture comprising (i) a cationic polymeric dispersant and (ii) a monomer composition is subjected to a free radical polymerization reaction.

The aqueous reaction mixture according to the invention comprises water, preferably deionized water. The water content may vary from 0.01 to 99.99 wt.-%. In a preferred embodiment, the water content is within the range of from 10 to 90 wt.-%, more preferably 15 to 85 wt.-%, still more preferably 20 to 80 wt.-%, yet more preferably 25 to 75 wt.-%, most preferably 30 to 70 wt.-% and in particular 35 to 65 wt.-%, based on the total weight of the aqueous reaction mixture. In another preferred embodiment, the water content is within the range of from 35 to 90 wt.-%, more preferably 40 to 85 wt.-%, still more preferably 45 to 80 wt.-%, yet more preferably 50 to 75 wt.-%, most preferably 55 to 70 wt.-% and in particular 60 to 66 wt.-%, based on the total weight of the aqueous reaction mixture.

Preferably, the water content of the aqueous reaction mixture is comparatively low so that the water content of the resultant water-in-water polymer dispersion is low as well. Under these circumstances it is not necessary to evaporate large amounts of water from the product after termination of polymerization in order to obtain highly concentrated water-in-water polymer dispersions.

The aqueous reaction mixture according to the invention further comprises a cationic polymeric dispersant. Preferably, the cationic polymeric dispersant is water-soluble or water-swellable. Preferably, the content of the cationic polymeric dispersant is within the range of from 0.1 to 40 wt.-%, more preferably 0.5 to 35 wt.-%, still more preferably 1.0 to 30 wt.-%, yet more preferably 5.0 to 25 wt.-%, most preferably 10 to 20 wt.-% and in particular 12 to 16 wt.-%, based on the total weight of the aqueous reaction mixture.

Preferably, the cationic polymeric dispersant exhibits a degree of polymerization of at least 90%, more preferably at least 95%, still more preferably at least 99%, yet more preferably at least 99.9%, most preferably at least 99.95% and in particular at least 99.99%.

In a preferred embodiment, the cationic polymeric dispersant is a water-soluble polymer having a weight average molecular weight $M_w$ of at most $2.0 \times 10^6$ g/mol. Preferably, the weight average molecular weight $M_w$ of the cationic polymeric dispersant is within the range of from 50,000 to 1,500,000 g mol$^{-1}$, more preferably 75,000 to 1,250,000 g mol$^{-1}$, still more preferably 100,000 to 1,000,000 g mol$^{-1}$, yet more preferably 120,000 to 750,000 g most preferably 140,000 to 400,000 g mol$^{-1}$ and in particular 150,000 to 200,000 g mol$^{-1}$. In a preferred embodiment, the weight average molecular weight $M_w$ of the cationic polymeric dispersant is within the range of from 75,000 to 350,000 g mol$^{-1}$.

Preferably, the molecular weight dispersity $M_w/M_n$ of the cationic polymeric dispersant is within the range of from 1.0 to 4.0, more preferably 1.5 to 3.5 and in particular 1.8 to 3.2. In a preferred embodiment, $M_w/M_n$ is within the range of from 2.7±0.7, more preferably 2.7±0.5, still more preferably 2.7±0.4, yet more preferably 2.7±0.3, most preferably 2.7±0.2 and in particular 2.7±0.1.

In a preferred embodiment the cationic polymeric dispersant is a homopolymer or a copolymer. When the cationic polymeric dispersant is a homopolymer, it is derived from a cationic monomer. When the cationic polymeric dispersant is a copolymer, it is preferably derived from at least one cationic monomer and at least one non-ionic co-monomer.

In this regard, "derived from" means that the polymer backbone of the cationic polymeric dispersant comprises repetition units, i.e., repetition units are incorporated in the polymer backbone of the cationic polymeric dispersant, which repetition units are formed from the corresponding monomers in the course of the polymerization reaction. For example, when the cationic polymeric dispersant is derived from trimethylammoniumpropyl acrylamide (=DIMAPA quat.), the following repetition unit is incorporated in the polymer backbone:

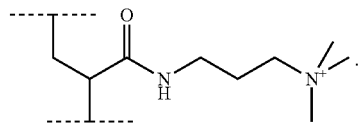

When the cationic polymeric dispersant is a copolymer of at least one cationic monomer (e.g. DIMAPA quat.) and at least one non-ionic monomer (e.g. acrylamide), the content of the cationic monomer is preferably at least 50 wt.-%, more preferably at least 60 wt.-%, still more preferably at least 70 wt.-%, yet more preferably at least 80 wt.-%, most preferably at least 90 wt.-% and in particular at least 95 wt.-%, based on the total weight of all monomers incorporated in the cationic polymeric dispersant.

Preferably, the cationic polymeric dispersant is derived from one or more cationic monomers, more preferably from a single cationic monomer.

In a preferred embodiment, the cationic polymeric dispersant is derived from one or more radically polymerizable, ethylenically unsaturated monomers. Preferably, the cationic polymeric dispersant is derived from one or more cationic monomers selected from the group consisting of (alk)acrylamidoalkyltrialkyl ammonium halides (e.g., trimethylammonium-alkyl(meth)acrylamide halides), (alk)acryloyloxyalkyl trialkyl ammonium halides (e.g., trimethylammoniumalkyl (meth)acrylate halides), alkenyl trialkyl ammonium halides and dialkenyl dialkyl ammonium halides (e.g., diallyldialkylammonium halides). Preferably, the aforementioned cationic monomers comprise 6 to 25 carbon atoms, more preferably 7 to 20 carbon atoms, most preferably 7 to 15 carbon atoms and in particular 8 to 12 carbon atoms.

Preferably, the cationic polymeric dispersant is derived from
- 30 to 100 wt.-%, more preferably 50 to 100 wt.-%, still more preferably 70 to 100 wt.-% of (alk)acrylamidoalkyltrialkyl ammonium halides, (alk)acryloyloxyalkyl trialkyl ammonium halides, alkenyl trialkyl ammonium halides, and/or dialkenyl dialkyl ammonium halides, and
- 0 to 70 wt.-%, more preferably 0 to 50 wt.-%, still more preferably 0 to 30 wt.-% of nonionic monomers, still more preferably non-ionic monomers according to general formula (I)

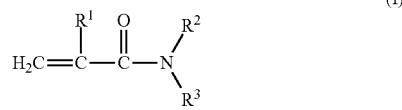
(I)

wherein
$R^1$ means hydrogen or $C_1$-$C_3$-alkyl; and
$R^2$ and $R^3$ mean, independently of each other, hydrogen, $C_1$-$C_5$-alkyl or $C_1$-$C_5$-hydroxyalkyl,
most preferably (alk)acrylamide.

In a preferred embodiment, the cationic polymeric dispersant is derived from a dialkenyl dialkyl ammonium halide, preferably a diallyl dimethyl ammonium halide (DADMAC).

In another preferred embodiment, the cationic polymeric dispersant is a copolymerizate of epichlorohydrin and dialkylamine, preferably dimethylamine, i.e. poly-[N,N-dimethyl-2-hydroxy-propylen-(1,3)-ammonium chloride].

In still another preferred embodiment, the cationic polymeric dispersant is derived from a cationic monomer according to general formula (II)

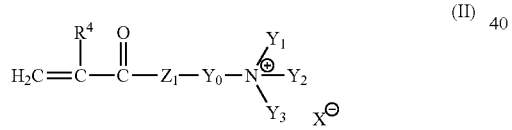
(II)

wherein
$R^4$ means hydrogen or $C_1$-$C_3$-alkyl, preferably H or methyl;
$Z_1$ means O or $NR^5$ with $R^5$ being hydrogen or $C_1$-$C_3$-alkyl;
$Y_0$ means $C_2$-$C_6$-alkylene, optionally substituted with one or more hydroxy groups, preferably $C_2$-$C_3$-alkylene;
$Y_1$, $Y_2$, $Y_3$, independently of each other, mean $C_1$-$C_6$-alkyl, preferably methyl; and
$X^-$ means halogen, pseudo-halogen (e.g., $CN^-$, $SCN^-$, $NCS^-$, $N_3^-$), acetate or $SO_4CH_3^-$, preferably chloride.

Preferably, $Y_1$, $Y_2$ and $Y_3$ are identical, preferably methyl. In a preferred embodiment, $Z_1$ is O or NH, $Y_0$ is ethylene or propylene, $R^4$ is hydrogen or methyl, and $Y_1$, $Y_2$ and $Y_3$ are methyl. The cationic monomer according to general formula (II) may be an ester ($Z_1$=O), such as trimethylammoniumethyl(meth)acrylate (ADAME quat.). Preferably, however, the cationic monomer according to general formula (I) is an amide ($Z_1$=NH), particularly trimethylammonium-propyl acrylamide (DIMAPA quat).

Preferred cationic monomers according to general formula (II) include quaternized dialkyl-aminoalkyl (meth)acrylates or dialkylaminoalkyl(meth)acrylamides with 1 to 3 C atoms in the alkyl or alkylene groups, more preferably the methyl chloride-quaternized ammonium salt of dimethylamino methyl(meth)acrylate, dimethylamino ethyl(meth)acrylate, dimethylamino propyl(meth)acrylate, diethylamino methyl (meth)acrylate, diethylamino ethyl(meth)acrylate, diethylamino propyl(meth)acrylate, dimethylamino methyl(meth) acrylamide, dimethylamino ethyl(meth)acrylamide, dimethylamino propyl(meth)acrylamide, diethylamino methyl(meth)-acrylamide, diethylamino ethyl(meth)acrylamide, diethylamino propyl(meth)acrylamide.

Quaternized dimethylaminoethyl acrylate and dimethylaminopropylacrylamide are particularly preferred. Quaternization may be effected using dimethyl sulfate, diethyl sulfate, methyl chloride or ethyl chloride. In a preferred embodiment, monomers are quaternized with methyl chloride.

When the cationic polymeric dispersant is a copolymer, it is preferably derived from at least one cationic monomer in combination with at least one non-ionic monomer.

Suitable non-ionic monomers include non-ionic monomers according to general formula (I). Examples of non-ionic monomers according to general formula (I) include (meth) acrylamide, N-methyl(meth)acrylamide, N-isopropyl(meth) acrylamide or N,N-substituted (meth)acryl amides such as N,N-dimethyl(meth)acrylamide, N,N-diethyl(meth)acrylamide, N-methyl-N-ethyl(meth)acrylamide or N-hydroxyethyl(meth)acrylamide.

Further suitable non-ionic monomers include non-ionic amphiphilic monomers according to general formula (III)

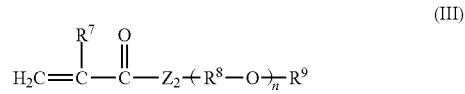
(III)

wherein
$Z_2$ means O, NH or $NR^6$ with $R^6$ being $C_1$-$C_3$-alkyl,
$R^7$ means hydrogen or $C_1$-$C_3$-alkyl,
$R^8$ means $C_2$-$C_6$-alkylene,
$R^9$ means hydrogen, $C_8$-$C_{32}$-alkyl, $C_8$-$C_{32}$-aryl and/or $C_8$-$C_{32}$-aralkyl, and
n means an integer between 1 and 50, preferably 1 and 20.

Examples of amphiphilic monomers of general formula (III) include reaction products of (meth)acrylic acid and polyethylene glycols (10 to 50 ethylene oxide units), which are etherified with a fatty alcohol, or the corresponding reaction products with (meth)acrylamide.

In a preferred embodiment, the cationic polymeric dispersant is substantially linear, i.e. is not derived from monomer mixtures containing cross-linkers.

In another preferred embodiment, the cationic polymeric dispersant is cross-linked. Examples of suitable cross-linkers are known to the skilled person and are further described herein below.

Cross-linking may be achieved by radical reactions, i.e. in the course of the propagation of all polymer chains, i.e. of the "main backbones". For that purpose, the cross-linker preferably contains an appropriate number of ethylenically unsaturated groups that are capable of reacting in free radical chain growth reaction.

Alternatively, however, cross-linking may also be achieved by non-radical reactions, e.g. addition or condensation reactions known to the skilled artisan. For that purpose, the cross-linker preferably contains an appropriate number of functional groups that are capable of reacting with one another, optionally after addition of a reaction partner reagent. Under these circumstances, cross-linking can be initiated simultaneously with the radical polymerization of the other monomers. Preferably, however, cross-linking is initiated subsequently to the radical polymerization of the other monomers, i.e. the cross-linker are incorporated into the non-cross-linked polymers in a first reaction step and subsequently cross-linked with one another.

In both cases the cross-linker is preferably incorporated into the polymer backbone first. Thus, the cross-linker preferably contains at least a single ethylenically unsaturated functional group so that it is capable of reacting with the other monomers in a free radical polymerization reaction.

Preferably, the cross-linked cationic polymeric dispersant is derived from a monomer composition containing 0.0001 to 1.25 wt.-% of one or more preferably ethylenically unsaturated cross-linkers, preferably 0.0001 to 1.0 wt.-%, more preferably 0.0001 to 0.5 wt.-%, still more preferably 0.0001 to 0.1 wt.-%, yet more preferably 0.0001 to 0.05 wt.-%, most preferably and in particular 0.0001 to 0.02 wt.-%, based on the total weight of monomers.

The aqueous reaction mixture may contain additional water-soluble dispersant components in combination with the cationic polymeric dispersant. Under these circumstances, the weight ratio of the cationic polymeric dispersant to said additional water-soluble dispersant components is preferably within the range of from 1:0.01 to 1:0.5, preferably 1:0.01 to 1:0.3. By way of example, cellulose derivatives, polyvinyl acetates, starch, starch derivatives, dextrans, polyvinylpyrrolidones, polyvinylpyridines, polyethyleneimines, polyamines, polyvinylimidazoles, polyvinylsuccinimides, polyvinyl-2-methylsuccinimides, polyvinyl-1,3-oxazolidin-2-ones, polyvinyl-2-methylimidazolines and/or the respective copolymers thereof with maleic acid, maleic anhydride, fumaric acid, itaconic acid, itaconic anhydride, (meth)acrylic acid, salts of (meth)acrylic acid and/or (meth)acrylamide compounds may be mentioned as additional water-soluble dispersant components.

Besides the cationic polymeric dispersant, the aqueous reaction mixture comprises a monomer composition. The monomer composition in turn comprises
a) at least 5 wt.-%, preferably at least 20 wt.-% of a non-ionic monomer according to general formula (I);
b) at least 5 wt.-%, preferably at least 20 wt.-%, preferably 20 to 47 wt.-% or 50.5 to 80 wt.-%, of a cationic monomer according to general formula (II);
c) 0.0001 to 1.25 wt.-% of one or more preferably ethylenically unsaturated cross-linkers;
d) optionally, up to 1.25 wt.-% of one or more hydrophobic (meth)acrylic acid $C_{4-18}$-alkyl esters; and
e) optionally, further ethylenically unsaturated monomers;
all percentages being based on the total molar amount of monomers.

In this regard the sum of the values in wt.-% needs not to amount to 100 wt.-%, since further ethylenically unsaturated monomers e) may be contained in the monomer composition, i.e. in the aqueous reaction mixture, which have to be taken into account when determining the total amount of monomers. Preferably, however, monomer composition consists of monomers a), b) and c) so that the sum of the three values in wt.-% amounts to 100 wt.-%, i.e. no further monomers are present.

The monomer composition contains at least 5 wt.-%, preferably at least 20 wt.-%, preferably at least 25 wt.-%, more preferably at least 30 wt.-%, still more preferably at least 35 wt.-%, yet more preferably at least 40 wt.-%, most preferably at least 45 wt.-% and in particular at least 50 wt.-% of a non-ionic monomer according to general formula (I), based on the total molar amount of all monomers.

In a preferred embodiment, the monomer composition contains 53 to 80 wt.-%, preferably 67±12 wt.-%, more preferably 67±11 wt.-%, still more preferably 67±10 wt.-%, yet more preferably 67±9 wt.-%, most preferably 67±8 wt.-% and in particular 67±7 wt.-% of a non-ionic monomer according to general formula (I), based on the total molar amount of all monomers.

In another preferred embodiment, the monomer composition contains 20 to 49.5 wt.-%, preferably 34±12 wt.-%, more preferably 34±11 wt.-%, still more preferably 34±10 wt.-%, yet more preferably 34±9 wt.-%, most preferably 34±8 wt.-% and in particular 34±7 wt.-% of a non-ionic monomer according to general formula (I), based on the total molar amount of all monomers.

Preferably, the non-ionic ethylenically unsaturated monomer according to formula (I) is water-soluble. Preferably, the non-ionic monomer according to formula (I) is selected from the group consisting of (meth)acrylamide, N-methyl(meth)acrylamide, N-isopropyl(meth)-acrylamide, N,N-dimethyl(meth)acrylamide, N,N-diethyl(meth)acrylamide, N-methyl-N-ethyl(meth)acrylamide and N-hydroxyethyl(meth)acrylamide. Acrylamide is particularly preferred.

The monomer composition further contains at least 5 wt.-%, preferably at least 20 wt.-%, preferably at least 25 wt.-%, more preferably at least 30 wt.-%, still more preferably at least 35 wt.-%, yet more preferably at least 40 wt.-%, most preferably at least 45 wt.-% and in particular at least 50 wt.-% of a cationic monomer according to general formula (II), as defined supra, based on the total molar amount of all monomers.

In a preferred embodiment, the monomer composition contains 20 to 47 wt.-%, preferably 33±12 wt.-%, more preferably 33±11 wt.-%, still more preferably 33±10 wt.-%, yet more preferably 33±9 wt.-%, most preferably 33±8 wt.-% and in particular 33±7 wt.-% of a cationic monomer according to general formula (II), based on the total molar amount of all monomers.

In another preferred embodiment, the monomer composition contains 50.5 to 80 wt.-%, preferably 66±12 wt.-%, more preferably 66±11 wt.-%, still more preferably 66±10 wt.-%, yet more preferably 66±9 wt.-%, most preferably 66±8 wt.-% and in particular 66±7 wt.-% of a cationic monomer according to general formula (II), based on the total molar amount of all monomers.

Preferably, the cationic monomer according to general formula (II) is water-soluble.

Preferably, the cationic monomer according to general formula (II) is an amide ($Z_1$=NH), e.g., trimethylammoniumalkyl(meth)acrylamide halides, particularly dimethylaminopropyl acrylamide quaternized with methylchloride (DIMAPA quat).

More preferably, however, the cationic monomer according to general formula (II) is an ester ($Z_1$=O), e.g., trimethylammoniumalkyl(meth)acrylate halides, particularly dimethylaminoethyl (meth)acrylate quaternized with methylchloride (ADAME quat.). Preferably, the cationic monomer according to general formula (II) is selected from the group consisting of methyl chloride quaternized ammonium salts of dimethylaminomethyl(meth)acrylate, dimethylaminoethyl(meth)acrylate, dimethylaminopropyl(meth)

acrylate, dimethylaminomethyl(meth)acrylamide, dimethylaminoethyl(meth)acrylamide and dimethylaminopropyl(meth)acrylamide.

Preferably, the radical reactivity ratios of the cationic monomer according to general formula (II) $r_1$ and of the non-ionic monomer according to general formula (I) $r_2$ are each within the range of from 0.01 to 100, more preferably 0.02 to 50, still more preferably 0.05 to 20, most preferably 0.1 to 10 and in particular 0.2 to 5. In this context, $r_1$ is defined as the ratio of two propagation constants involving a radical of the cationic ethylenically unsaturated monomer: The ratio always compares the propagation constant for the monomer of the same type adding to the radical ($k_{11}$) relative to the propagation constant for the addition of the comonomer ($k_{12}$), i.e., $r_1 = k_{11}/k_{12}$. In analogy, $r_2 = k_{22}/k_{21}$. For further details it can be referred e.g. to Paul C. Hiemenz, Polymer Chemistry, Marcel Dekker New York, 1984, Chapter 7.2.

When the cationic polymeric dispersant is also derived from a cationic ethylenically unsaturated monomer, said cationic ethylenically unsaturated monomer may be different from or identical with the cationic monomer according to general formula (II) contained in the monomer composition, i.e. in the aqueous reaction mixture. Preferably, both monomers differ from one another so that the repetition units of the cross-linked cationic copolymer differ from the repetition units of the cationic polymeric dispersant. Thus, the cationic polymeric dispersant and the cross-linked cationic copolymer preferably differ from each other, said difference possibly involving physical variables such as different molecular weight and/or chemical structure, as well as different monomer composition.

The monomer composition further contains 0.0001 to 1.25 wt.-% of one or more preferably ethylenically unsaturated cross-linkers, based on the total weight of monomers.

Cross-linkers are known to the skilled artisan. Some aspects have already been described above in connection with the cross-linked cationic polymeric dispersant. These aspects shall also apply to the cross-linkers of the cross-linked cationic copolymer and vice versa.

According to the invention, the cross-linker contains preferably ethylenically unsaturated groups that are radically polymerizable. Preferably, the ethylenically unsaturated cross-linker contains 2, 3, 4 or 5 ethylenically unsaturated groups.

Examples of cross-linkers with two radically polymerizable ethylenically unsaturated groups include:

(1) Alkenyl di(meth)acrylates, such as 1,6-hexanediol di(meth)acrylate, 1,10-decanediol di(meth)acrylate, 1,12-dodecanediol di(meth)acrylate, 1,18-octadecanediol di(meth)acrylate, neopentyl glycol di(meth)acrylate, methylene di(meth)acrylate, 2,2'-bis(hydroxymethyl)-1,3-propanediol di(meth)acrylate, and preferably, ethylene glycol di(meth)acrylate, 1,3-propanediol di(meth)acrylate, 1,3-butanediol di(meth)acrylate, and 1,4-butanediol di(meth)acrylate;

(2) Alkylene di(meth)acrylamides, e.g. N-methylene di(meth)acrylamide, N,N'-3-methylbutylidene bis(meth) acrylamide, N,N'-(1,2-dihydroxyethylene)bis(meth)acrylamide, and preferably N,N'-hexamethylene bis(meth)acrylamide, and particularly preferably N,N'-methylene bis(meth) acrylamide;

(3) Polyalkoxydi(meth)acrylates according to general formula (IV)

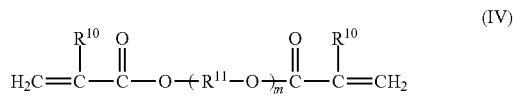

where
$R^{10}$ is hydrogen or methyl;
$R^{11}$ is selected from —CH$_2$CH$_2$—, —CH$_2$CH$_2$CH$_2$—, —CH$_2$CH$_2$CH$_2$CH$_2$—, —CH$_2$CH$_2$CH$_2$CH$_2$CH$_2$— or —CH$_2$CH$_2$CH$_2$CH$_2$CH$_2$CH$_2$—; and
m is an integer in the range 2-50.

Examples of cross-linkers according to general formula (IV) include polypropylene glycol di(meth)acrylates with m in the range 4-25; polybutylene glycol di(meth)acrylates with m in the range 5-40; and, preferably, polyethylene glycol di(meth)acrylates with m in the range 2-45, e.g. diethylene glycol di(meth)acrylate, triethylene glycol di(meth)acrylate, tetraethylene glycol di(meth)acrylate; and, more preferably, polyethylene glycol di(meth)acrylates with m in the range 5-20;

(4) Examples of additional di(meth)acrylates which may be used include benzylidene di(meth)acrylate, bisphenol-A di(meth)acrylate, 1,3-di(meth)acryloyloxy-2-propanol, hydroquinone di(meth)acrylate, ethanedithiol di(meth)acrylate, propanedithiol di(meth)acrylate, polyethylene dithiol di(meth)acrylate, and polypropylene dithiol di(meth)acrylate;

(5) Divinyl compounds, for example, 1,4-butanediol divinyl ether, divinylbenzene, butadiene, 1,6-hexadiene; di(meth)allyl compounds, such as, for example, di(meth)allyl phthalate or di(meth)allyl succinate; vinyl(meth)acrylic compounds, for example, vinyl(meth)acrylate; or preferably (meth)allyl (meth)acrylic compounds, for example, allyl(meth)acrylate.

Examples of cross-linkers having 3 or more ethylenically unsaturated radically polymerizable groups include glycerin tri(meth)acrylate, 2,2-dihydroxymethyl-1-butanol tri(meth) acrylate, trimethylolpropane triethoxy tri(meth)acrylate, trimethacrylamide, (meth)allylidene di(meth)acrylate, 3-allyloxy-1,2-propanediol di(meth)acrylate, triallyl amine, triallyl cyanurate or triallyl isocyanurate; and also (as representative compounds with more than 3 ethylenically unsaturated radically polymerizable groups) pentaerythritol tetra(meth)acrylate and N,N,N'N'-tetra(meth)acryloyl-1,5-pentanediamine.

An example of a cross-linker having 5 ethylenically unsaturated radically polymerizable groups is dipentaerithritolpentaacrylate.

Particularly preferred cross-linkers are selected from the group consisting of methylene bisacrylamide, polyethylene glycol diacrylate and triallylamine.

Further preferred cross-linkers include asymmetrically cross-linkable monomers, i.e. cross-linkable monomers which rely on different functional groups with respect to the incorporation reaction into the polymer backbone and the cross-linking reaction. Examples of such asymmetrically cross-linkable monomers include N'-methylol acrylamide, N'-methylol methacrylamide and glycidyl(meth)acrylate.

Cross-linkers of this type have the advantage that cross-linking may be initiated subsequently. Thus, cross-linking may be performed under different conditions than the radical polymerization of the main-backbone. Preferably, cross-linking is initiated after changing the reaction conditions, e.g. the pH value (addition of acid or base), the temperature, and the like.

In a preferred embodiment, cross-linking is performed in an after-reaction at a temperature that is up to about 40° C. higher than the temperature of the previous radical polymerization reaction. Cross-linking may last 0.1 to 10 hours. Typically, cross-linking is performed for 0.5 to 3 hours at a temperature that is 5 to 15° C. higher than the temperature of the previous radical polymerization reaction.

Preferably, the asymmetrically cross-linkable monomers contain N-methylol groups. N-methylol-compounds (N-hydroxymethyl compounds) are known to the skilled artisan and can be prepared e.g. by condensation of formaldehyde with amides or amines. N-methylol groups are capable of reacting with other N-methylol groups (self cross-linking) as well as with other functional groups such as amide groups or hydroxy groups (partner cross-linking). Preferred partners are amide moieties of acrylamide.

For the purpose of the specification, the preferred quantity of the asymmetrically cross-linkable monomers as cross-linker preferably refers to the asymmetrically cross-linkable monomer as such, but does not include any non-asymmetrically cross-linkable monomer. For example, if cross-linking is achieved by reaction of a monomer containing N-methylol groups and acrylamide, the preferred quantity of the cross-linker does not encompass the quantity of the acrylamide.

Alternatively, cross-linking may be achieved by compounds that are not radically polymerizable themselves. Such compounds may for example comprise at least two N-methylol groups that are capable of reacting with amide moieties of acrylamide residues of different polymer chains thereby leading to a cross-linked polymer network. Examples include dimethylurea, trimethylolmelamine, hexamethylolmelamine or low-molecular water soluble melamine resins. Such compounds may be added prior to and/or in the course of the radical polymerization reaction, although they do not react or, merely to a minor extent. Typically, they react in the after-reaction at elevated temperature as described above.

Another example of such compound that does not react in the free radical polymerization but is capable of cross-linking the thus obtained polymer is glyoxal which is typically hydrated in aqueous solution. The cross-linking reaction based on glyoxal is illustrated here below:

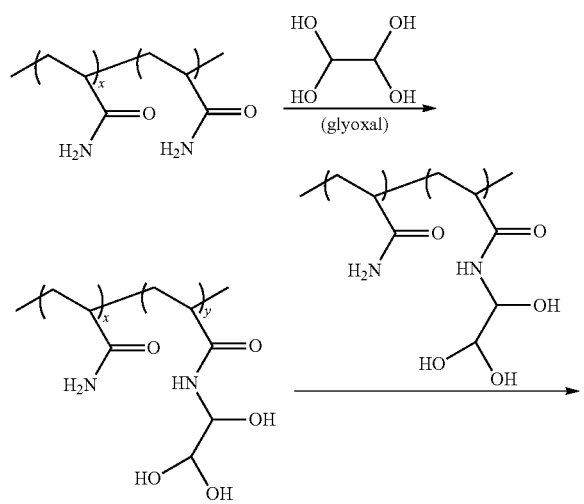

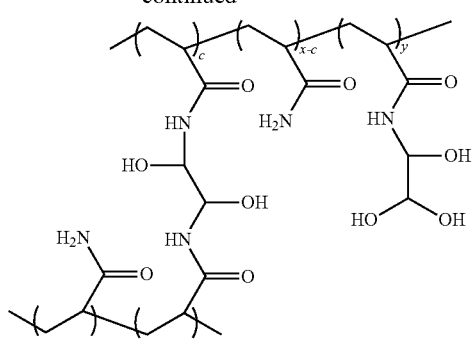

The monomer composition contains 0.0001 to 1.25 wt.-% of one or more preferably ethylenically unsaturated cross-linkers, preferably 0.0001 to 1.0 wt.-%, more preferably 0.0001 to 0.5 wt.-%, still more preferably 0.0001 to 0.1 wt.-%, yet more preferably 0.0001 to 0.05 wt.-%, most preferably and in particular 0.0001 to 0.02 wt.-%, based on the total weight of monomers.

A skilled person realizes that the total amount of cross-linker does not necessarily have to be present from the very beginning of the polymerization reaction. It may also be added in the course of the polymerization reaction. If the cross-linker itself does not bear any radically polymerizable groups, i.e. if cross-linking is based on another chemistry such as the above glyoxal linkage, the entire amount of the cross-linker may even be added subsequently to the radical polymerization reaction. In this regard, the content of 0.0001 to 1.25 wt.-% of one or more cross-linkers to the aqueous reaction mixture which is subjected to a free radical polymerization reaction may also be added after the free radical polymerization reaction, provided that a suitable after-reaction takes place such that the thus resulting water-in-water polymer dispersion contains a cross-linked cationic polymer.

Therefore, the present invention also relates to a method for manufacturing a water-in-water polymer dispersion which comprises the steps A) subjecting an aqueous reaction mixture comprising
(i) a cationic polymeric dispersant and
(ii) a monomer composition comprising
   a) at least 5 wt.-%, preferably at least 20 wt.-% of a nonionic monomer according to general formula (I)

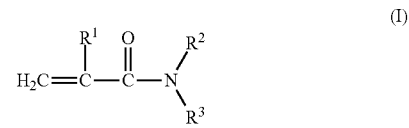

wherein
   $R^1$ means hydrogen or $C_1$-$C_3$-alkyl; and
   $R^2$ and $R^3$ mean, independently of each other, hydrogen, $C_1$-$C_5$-alkyl or $C_1$-$C_6$-hydroxyalkyl;
   based on the total weight of monomers;
b) at least 5 wt.-%, preferably at least 20 wt.-%, preferably 20 to 47 wt.-% or 50.5 to 80 wt.-%, of a cationic monomer according to general formula (II)

$$H_2C=\underset{R^4}{\overset{}{C}}-\underset{}{\overset{O}{\overset{\|}{C}}}-Z_1-Y_0-\underset{Y_3}{\overset{Y_1}{\overset{}{N^{\oplus}}}}Y_2 \quad X^{\ominus} \quad (II)$$

wherein
- $R^4$ means hydrogen or $C_1$-$C_3$-alkyl;
- $Z_1$ means O or $NR^5$ with $R^5$ being hydrogen or $C_1$-$C_3$-alkyl;
- $Y_0$ means $C_2$-$C_6$-alkylene, optionally substituted with one or more hydroxy groups;
- $Y_1, Y_2, Y_3$, independently of each other, mean $C_1$-$C_6$-alkyl; and
- $X^-$ means halogen, pseudo-halogen, acetate, or $SO_4CH_3^-$; based on the total weight of monomers;

c) 0 to 1.25 wt.-% of one or more hydrophobic (meth) acrylic acid $C_{4-18}$-alkyl esters, based on the total weight of monomers; and
d) optionally, further ethylenically unsaturated monomers;
to a free radical polymerization reaction such that a cationic prepolymer is obtained;

B) adding 0.0001 to 1.25 wt.-% of one or more cross-linkers, based on the total weight of monomers employed in step A) to the thus obtained prepolymer; and C) subjecting the prepolymer to a cross-linking reaction (after-reaction); such that the resulting water-in-water polymer dispersion contains a cross-linked cationic copolymer.

In this regard, the term "nomomer composition" shall also include compositions comprising the prepolymers and the cross-linker prior to effecting the cross-linking reaction.

The monomer composition contains optionally, up to 1.25 wt.-% of one or more hydrophobic (meth)acrylic acid $C_{4-18}$-alkyl esters, based on the total weight of monomers. Preferably, however, the monomer composition does not contain any hydrophobic (meth)acrylic acid $C_{4-18}$-alkyl esters, such as butyl acrylate, butyl methacrylate, lauryl acrylate, lauryl methacrylate, and the like.

Preferably, the monomer composition does not contain any hydrophobic monomers. In this regard, hydrophobic monomers are preferably defined as monomers that are not water soluble. Thus, the monomer composition preferably does not contain any monomers having a solubility in pure water at ambient temperature of below 10 g $l^{-1}$, more preferably below 25 g $l^{-1}$, still more preferably below 50 g $l^{-1}$, yet more preferably below 100 g $l^{-1}$, most preferably below 250 g $l^{-1}$ and in particular below 500 g $l^{-1}$.

Preferably, the monomer composition does not contain any hydrophobic monomers according to general formula (V)

$$H_2C=\underset{R^{13}}{\overset{R^{12}}{\overset{|}{C}}}-R^{13} \quad (V)$$

where
- $R^{12}$ is hydrogen or $C_{1-5}$-alkyl; and
- $R^{13}$ is alkyl, cycloalkyl, aryl or aralkyl each having 1 to 20 carbon atoms; or —C(=O)—$Z_0$—$R^{14}$
wherein $Z_0$ is O, NH or $NR^{14}$ with $R^{14}$ being alkyl, cycloalkyl, aryl or aralkyl each having 1 to 20 carbon atoms.

The monomer composition may optionally contain further ethylenically unsaturated polymers that are radically polymerizable. Preferably, however, the monomer composition does not contain such monomers, i.e. preferably consists of components a), b), c) and optionally d), particularly preferably consists of components a), b) and c).

In a preferred embodiment of the aqueous reaction mixture according to the invention,
- the cationic polymeric dispersant is a cationic polymer derived from at least one monomer selected from trimethylammoniumalkyl(meth)acrylate halides and trimethylammoniumalkyl(meth)acrylamide halides; and/or
- the cationic monomer according to general formula (II) is selected from the group consisting of trimethylammoniumalkyl(meth)acrylate halides, trimethylammoniumalkyl(meth)acrylamide halides and diallyldialkylammonium halides; and/or
- the non-ionic monomer according to general formula (I) is (meth)acrylamide.

In a particularly preferred embodiment of the aqueous reaction mixture according to the invention,
- the cationic polymeric dispersant is derived from one or more monomers comprising an (alk)acrylamidoalkyl trialkyl ammonium halide;
- the cationic monomer according to general formula (II) is an (alk)acryloyloxyalkyl trialkyl ammonium halide; and
- the non-ionic monomer according to general formula (I) is an (alk)acrylamide.

The method according to the invention includes the step of subjecting an aqueous reaction mixture to a free radical polymerization reaction. Usually, before the free radical polymerization reaction is initiated, the aqueous reaction mixture is prepared from its components (i) and (ii), i.e. from the cationic polymeric dispersant and the monomer composition.

The preparation of aqueous reaction mixtures is known to the skilled person. The components may be added simultaneously or consecutively. The components may be added by conventional means, e.g. by pouring or dropping liquids, by dosing powders, and the like.

In principle, it is not necessary that the entire amount of each component is initially present when the aqueous reaction mixture is prepared. Alternatively, partial dispersion of the monomers can be effected at the beginning of the polymerization, the remainder of the monomers being added as metered portions or as a continuous feed distributed over the entire course of polymerization. For example, only a certain portion of a particular component, e.g., only 70 wt.-% of the cationic monomer according to general formula (II), may be initially employed, and thereafter, possibly in the course of the polymerization reaction, the remainder of said particular component, e.g., the residual 30 wt.-% of the cationic monomer according to general formula (II), is employed.

In a preferred embodiment of the method according to the invention, before the aqueous reaction mixture is subjected to a radical polymerization, a water-soluble salt is added in quantities of 0.1 to 5.0 wt.-%, based on the total weight of the aqueous reaction mixture.

Ammonium, alkali metal and/or alkaline earth metal salts, preferably ammonium, sodium, potassium, calcium and/or magnesium salts, can be used as water-soluble salts. Such salts can be salts of an inorganic acid or of an organic acid, preferably of an organic carboxylic acid, sulfonic acid, phosphonic acid, or of a mineral acid. The water-soluble salts are preferably salts of an aliphatic or aromatic mono-, di-, polycarboxylic acid, of a hydroxycarboxylic acid, preferably of acetic acid, propionic acid, citric acid, oxalic acid, succinic acid, malonic acid, adipic acid, fumaric acid, maleic acid or benzoic acid, or sulfuric acid, hydrochloric acid or phosphoric acid. Very particularly preferably, sodium chloride, ammonium sulfate and/or sodium sulfate are used as water-soluble salts.

The salts can be added before, during or after polymerization, polymerization preferably being carried out in the presence of a water-soluble salt.

After the aqueous reaction mixture has been prepared, it is subjected to a free radical polymerization reaction, i.e., polymerization of the monomer composition comprising the cationic monomer according to general formula (II), the nonionic monomer according to general formula (I), and the cross-linker and the optionally present further monomers in the presence of the cationic polymeric dispersant is initiated, thereby yielding the cross-linked cationic copolymer dispersed in the water-in-water polymer dispersion.

The skilled person knows how to radically polymerize monomers in an aqueous reaction mixture. Typically, the polymerization reaction is carried out in the presence of one or more conventional polymerization initiators.

Radicals may be formed, e.g., upon thermally induced or photochemically induced homolysis of single bonds or redox reactions.

Examples of suitable water-soluble initiators include, e.g., 2,2'-azobis-(2-amidinopropane) dihydrochloride, 4,4'-azobis-(4-cyanopentanoic acid), 2,2'-azobis(2-(-imidazolin-2-yl)propane dihydrochloride or redox systems such as ammonium persulfate/ferric sulfate. Oil-soluble initiators include, e.g., dibenzoyl peroxide, dilauryl peroxide or tert-butyl peroxide, or azo compounds such as 2,2'-azobisisobutyronitrile, dimethyl 2,2'-azobisisobutyrate and 2,2'-azobis-(4-methoxy-2,4-dimethylvaleronitrile). The initiators may be used either individually or in combinations and generally in an amount of about 0.015 to 0.5% by weight of the total weight of the aqueous reaction mixture. The skilled person principally knows how to modify the amount and type of the initiator in order to modify the properties of the resultant polymer product, e.g., its average molecular weight.

Preferably, azo compounds such as 2,2'-azobisisobutyronitrile, 2,2'-azobis(2-(-imidazolin-2-yl)propane dihydrochloride, 2,2'-azobis(2-aminopropane)dihydrochloride or preferably potassium persulfate, ammonium persulfate, hydrogen peroxide, optionally in combination with a reducing agent, e.g. an amine or sodium sulfite, are used as radical initiators. The amount of initiator, relative to the monomers to be polymerized, generally ranges from $10^{-3}$ to 1.0 wt.-%, preferably from $10^{-2}$ to 0.1 wt.-%. The initiators can be added completely or also only in part at the beginning of the polymerization, with subsequent apportioning of the residual amount over the entire course of polymerization. In a preferred embodiment, the polymerization is initiated by means of a sodiumperoxodisulfate and, after reaching the maximum temperature, continued with an azo initiator, such as 2,2'-azobis(2-(-imidazolin-2-yl)propane dihydrochloride. At the end of the polymerization, a redox initiator system is preferably added in order to reduce the content of residual monomers.

In another advantageous embodiment, once the exothermic polymerization reaction is complete, i.e. generally after the temperature maximum, the content of residual monomers is further reduced by subsequent addition of redox initiator.

In another advantageous embodiment of the method according to the invention, the aqueous reaction mixture and the cationic polymeric dispersant is apportioned into the polymerization reactor during polymerization. In general, a portion, e.g. 10 to 20% of the monomers and the cationic polymeric dispersant, is initially introduced. Following initiation of polymerization, the above-mentioned apportioning is effected, optionally accompanied by further apportioning of polymerization initiator.

In addition, it is also possible to remove water during polymerization and optionally to add further cationic polymeric dispersant.

The polymerization temperature generally is 0 to 120° C., preferably 30 to 90° C. The polymerization temperature can be selected based on the decomposition kinetics of the initiator used.

Polymerization times are the same as those conventionally used in the art, generally 1.5 to 18 hours and preferably 2 to 6 hours, although as little as one-half hour could be used. However, attempting more rapid polymerization over a shorter period of time creates problems with removing heat. In this regard it is greatly preferred that the polymerization medium be stirred well or otherwise agitated during the polymerization.

The equipment utilized for the polymerization can simply be standard reactors such as used for oil-in-water or water-in-oil or water-in-water polymerizations.

Polymerization conversion or the end of polymerization can easily be detected by determining the content of residual monomers. Methods for this purpose are familiar to those skilled in the art (e.g. HPLC).

The polymerization is preferably carried out in such a way that the system is purged with an inert gas and polymerized under an inert gas atmosphere, e.g. under a nitrogen atmosphere.

Following polymerization, it can be advantageous to cool down the aqueous reaction mixture before optionally adding further additives, such as salts or acids, to the dispersion, preferably with stirring.

To reduce the residual monomer content, it is also possible to increase the temperature during the course of the polymerization. Alternatively, it is also possible to use additional initiators during and at the end of the polymerization and/or residual monomer destructors.

Residual monomer destructors within the meaning of the invention are substances that modify polymerizable monomers by means of a chemical reaction in such a way that they are no longer polymerizable, such that within the meaning of the invention they are no longer monomers. Substances that react with the double bond present in the monomers and/or substances that can initiate a more extensive polymerization can be used for this purpose. As residual monomer destructors that react with the double bond, reducing agents can for example be used, preferably substances from the group of acids and neutral salts of acids derived from sulfur having an oxidation number lower than VI, preferably sodium dithionite, sodium thiosulfate, sodium sulfite or sodium disulfite, and/or substances having a hydrogen sulfide group, preferably sodium hydrogen sulfide or compounds from the group of thiols, preferably mercaptoethanol, dodecyl mercaptan, thiopropionic acid or salts of thiopropionic acid or thiopropanesulphonic acid or salts of thiopropanesulphonic acid, and/or substances from the group of amines, preferably from the group of amines with low volatility, preferably diisopropanolamine or aminoethyl ethanolamine, and/or substances from the group comprising Bunte salts, formamidine sulfinic acid, sulfur dioxide, aqueous and organic solutions of sulfur dioxide or thio urea.

Preferably, the water-in-water polymer dispersion has a residual content of cationic ethylenically unsaturated monomers of at most 5,000 ppm, more preferably at most 2,500 ppm, still more preferably at most 1,000 ppm, yet more preferably at most 800 ppm, most preferably at most 600 ppm an in particular at most 400 ppm.

Preferably, the water-in-water polymer dispersion has a residual content of non-ionic monomers according to general formula (I) of at most 5,000 ppm, more preferably at most 2,500 ppm, still more preferably at most 1,000 ppm, yet more preferably at most 800 ppm, most preferably at most 600 ppm an in particular at most 400 ppm.

The polymerization reaction transforms the aqueous reaction mixture into a water-in-water polymer dispersion.

After the polymerization reaction, the resultant water-in-water polymer dispersion may be distillated in order to reduce the content of the solvent.

In a preferred embodiment of the method according to the invention, acid is added after polymerization in quantities of 0.1 to 5.0 wt.-%, based on the total weight of the aqueous reaction mixture. Water-soluble organic acids and/or inorganic acids can be present. More specifically, suitable organic water-soluble acids are organic carboxylic acids, sulfonic acids, phosphonic acids, preferably aliphatic or aromatic mono-, di-, polycarboxylic acids and/or hydroxycarboxylic acids, preferably acetic acid, propionic acid, citric acid, oxalic acid, succinic acid, malonic acid, adipic acid, fumaric acid, maleic acid, benzoic acid, especially preferably citric acid, adipic acid and/or benzoic acid. Suitable inorganic acids are water-soluble mineral acids, preferably hydrochloric acid, sulfuric acid, nitric acid and/or phosphoric acid. Very particularly preferred are citric acid, adipic acid, benzoic acid, hydrochloric acid, sulfuric acid and/or phosphoric acid.

Preferably, the aqueous reaction mixture contains 0.5 to 5.0 wt.-% of at least one acid and/or 0.5 to 5.0 wt.-% of at least one salt, the overall content of acid and salt preferably amounting to 5.0 wt.-%, based on the total weight of the dispersion. Preferably, when a salt as well as an acid are present, the anion of the salt differs from the chemical nature of the acid, i.e. when the acid is citric acid, the salt is no citric acid salt.

A further aspect of the invention relates to a water-in-water polymer dispersion comprising water, a cationic polymeric dispersant and a cross-linked cationic copolymer.

The water-in-water polymer dispersion comprises (i) a cationic polymeric dispersant and (ii) a cross-linked cationic copolymer derived from a monomer composition containing a) at least 5 wt.-%, preferably at least 20 wt.-% of a non-ionic monomer according to general formula (I)

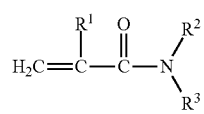

(I)

wherein
$R^1$ means hydrogen or $C_1$-$C_3$-alkyl; and
$R^2$ and $R^3$ mean, independently of each other, hydrogen, $C_1$-$C_5$-alkyl or $C_1$-$C_5$-hydroxyalkyl;
based on the total weight of monomers;

b) at least 5 wt.-%, preferably at least 20 wt.-% of a cationic monomer according to general formula (II)

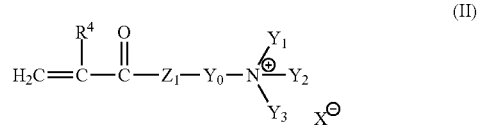

(II)

wherein
$R^4$ means hydrogen or $C_1$-$C_3$-alkyl;
$Z_1$ means O or $NR^5$ with $R^5$ being hydrogen or $C_1$-$C_3$-alkyl;
$Y_0$ means $C_2$-$C_6$-alkylene, optionally substituted with one or more hydroxy groups;
$Y_1, Y_2, Y_3$, independently of each other, mean $C_1$-$C_6$-alkyl; and
$X^-$ means halogen, pseudo-halogen, acetate, or $SO_4CH_3^-$;
based on the total weight of monomers;

c) 0.0001 to 1.25 wt.-% of one or more preferably ethylenically unsaturated cross-linkers, based on the total weight of monomers;

d) 0 to 1.25 wt.-% of one or more hydrophobic (meth) acrylic acid $C_{4-18}$-alkyl esters, based on the total weight of monomers; and e) optionally, further ethylenically unsaturated monomers.

Preferably, the water-in-water polymer dispersion is obtainable by the method according to the invention described above.

The water-in-water polymer dispersions according to the invention may be water-in-water polymer suspensions, water-in-water polymer emulsions, water-in-water polymer solutions or mixtures thereof.

In a preferred embodiment of the water-in-water polymer dispersion according to the invention the weight average molecular weight $M_w$ of the cross-linked cationic copolymer is higher than the weight average molecular weight $M_w$ of the cationic polymeric dispersant. The skilled person knows how to measure and to influence the weight average molecular weight of the cross-linked cationic copolymer, e.g. by modifying the initiator concentration, the addition of chain-transfer agents, and the like. Preferably, the weight average molecular weight is determined by gelpermeation chromatography (GPC), preferably using 1.5% formic acid as eluent versus pullulan standards, or rheological measurements.

Preferably, the cross-linked cationic copolymer exhibits a degree of polymerization of at least 90%, more preferably at least 95%, still more preferably at least 99%, yet more preferably at least 99.9%, most preferably at least 99.95% and in particular at least 99.99%.

Preferably, the weight average molecular weight of the cross-linked cationic copolymer is at least 1,000,000 g mol$^{-1}$, more preferably at least 1,250,000 g mol$^{-1}$, still more preferably at least 1,500,000 g mol$^{-1}$, yet more preferably at least 1,750,000 g mol$^{-1}$, most preferably at least 2,000,000 g mol$^{-1}$ and in particular at least 2,500,000 g mol$^{-1}$.

Preferably, the molecular weight dispersity $M_w/M_n$ of the cross-linked cationic copolymer is within the range of from 1.0 to 4.0, more preferably 1.5 to 3.5 and in particular 1.8 to 3.2. In a preferred embodiment, $M_w/M_n$ is within the range of from 2.7±0.7, more preferably 2.7±0.5, still more preferably 2.7±0.4, yet more preferably 2.7±0.3, most preferably 2.7±0.2 and in particular 2.7±0.1.

Preferably, the content of the cross-linked cationic copolymer is within the range of from 0.1 to 90 wt.-%, more preferably 1.0 to 80 wt.-%, still more preferably 2.5 to 70 wt.-%, yet more preferably 5.0 to 60 wt.-%, most preferably 10 to 40 wt.-% and in particular 15 to 25 wt.-%, based on the total weight of the water-in-water polymer dispersion.

Preferably, the overall polymer content, i.e. the content of cross-linked cationic copolymer and polymeric dispersant, is within the range of 40±20 wt.-%, more preferably 40±15 wt.-%, still more preferably 40±15 wt.-%, and most preferably 40±5 wt.-%, based on the total weight of the dispersion. In a preferred embodiment, the overall polymer content is at least 36 wt.-%, more preferably at least 37 wt.-%, still more preferably at least 38 wt.-%, most preferably at least 39 wt.-%, most preferably at least 40 wt.-% and in particular within the range of from 40 to 45 wt.-%.

In a preferred embodiment, the relative weight ratio of the cross-linked cationic copolymer to the cationic polymeric dispersant is within the range of from 10:1 to 0.1:1, more preferably 9:1 to 0.25:1, still more preferably 8:1 to 0.5:1, yet more preferably 7:1 to 1:1, most preferably 6:1 to 2:1 and in particular 5:1 to 3:1. In another preferred embodiment, the relative weight ratio of the cross-linked cationic copolymer to the cationic polymeric dispersant is within the range of from 9:1 to 0.05:1, more preferably 7:1 to 0.1:1, still more preferably 5:1 to 0.3:1, yet more preferably 3:1 to 0.5:1, most preferably 2:1 to 1:1 and in particular 1.5:1 to 1.2:1. Preferably, the relative weight ratio of cross-linked cationic copolymer:cationic polymeric dispersant is >1:1.

Preferably, the weight average molecular weight $M_w$ of the polymer mixture present in the water-in-water polymer dispersion, comprising the cross-linked cationic copolymer and the cationic polymeric dispersant, is in a range above $1.5 \cdot 10^6$ g/mol, as measured according to the GPC method.

Preferably, the water-in-water polymer dispersion according to the invention has
- a solution viscosity (according to Brookfield) within the range of from 500 to 5,000 mPas, more preferably 800 to 3,000 mPas, still more preferably 1,000 to 2,500 mPas, most preferably 1,200 to 2,000 mPas and in particular 1,400 to 1,800 mPas; and/or
- a product viscosity within the range of from 1,000 to 50,000 mPas, more preferably 5,000 to 30,000 mPas, still more preferably 8,000 to 25,000 mPas, most preferably 10,000 to 20,000 mPas and in particular 12,000 to 19,000 mPas; and/or
- a salt viscosity within the range of from 300 to 1,000 mPas, more preferably 350 to 900 mPas, still more preferably 400 to 850 mPas, most preferably 450 to 800 mPas and in particular 500 to 750 mPas.

Preferably, the water-in-water polymer dispersion according to the invention exhibits a tan delta value at 0.005 Hz (0.00464 Hz) in 0.5 wt.-% solution at 25° C. within the range of from 4.0 to 12.0, more preferably 4.5 to 10.0, most preferably 5.0 to 9.0.

Tan delta is a measure of viscoelasticity. The value of tan delta is the ratio of the loss (viscous) modulus G" to storage (elastic) modulus G' within the system. G' and G" measurements are recorded and used to calculate tan delta (G"/G') values. On the one hand, at equivalent stress, materials with a low tan delta (<1) and higher G' value strain or deform less, thus exhibiting a stronger associated structure. These materials are mechanically stable and do not relax within the time frame or at the frequency of the measurement. Such materials are thus more elastic. On the other hand, at equivalent stress, materials with a higher tan delta value (>1) and higher G" value exhibit a viscous type of response and the stress of the sample will permit a linear polymer to relax at a low frequency. It has been surprisingly found that when varying the chain length of the hydrophobic moiety of the hydrophobic monomer according to general formula (I) (=$R^2$), the tan delta value of the water-in-water polymer dispersion may be decreased. In other words, viscoelasticity of the system may be triggered by the chemical nature of the hydrophobic monomer.

The skilled person knows how to determine the tan delta value. Preferably, the tan delta at 0.005 Hz value is obtained using a rheometer in oscillation mode on a 0.5% by weight aqueous solution of polymer in deionized water after tumbling for two hours.

Preferably, the water-in-water polymer dispersions according to the invention are liquid. In comparison to powders and pastes, liquid dispersions are easier to dose. Powders usually require expensive dosing equipment.

The water content of the water-in-water polymer dispersion may be as it is after in situ polymerization. In a preferred embodiment, however, the water content is reduced, e.g. by vaporizing a portion of the water.

In a preferred embodiment the water content of the water-in-water polymer dispersion is within the range of 40±25 wt.-%, more preferably 40±20 wt.-%, still more preferably 40±15 wt.-%, yet more preferably 40±10 wt.-%, most preferably 40±7.5 wt.-% and in particular 40±5 wt.-%. In another preferred embodiment the water content of the water-in-water polymer dispersion is within the range of 50±25 wt.-%, more preferably 50±20 wt.-%, still more preferably 50±15 wt.-%, yet more preferably 50±10 wt.-%, most preferably 50±7.5 wt.-% and in particular 50±5 wt.-%. In still another preferred embodiment the water content of the water-in-water polymer dispersion is within the range of 60±25 wt.-%, more preferably 60±20 wt.-%, still more preferably 60±15 wt.-%, yet more preferably 60±10 wt.-%, most preferably 60±7.5 wt.-% and in particular 60±5 wt.-%. In still another preferred embodiment, the water content of the water-in-water polymer dispersion is within the range of 63±20 wt.-%, more preferably 63±15 wt.-%, still more preferably 63±10 wt.-%, yet more preferably 63±7 wt.-%, most preferably 63±5 wt.-% and in particular 63±3 wt.-%. In a particularly preferred embodiment, the water content of the water-in-water polymer dispersion is at most 80 wt.-%, more preferably at most 75 wt.-%, still more preferably at most 72 wt.-%, yet more preferably at most 70 wt.-%, most preferably at most 68 wt.-% and in particular at most 67 wt.-%.

In a preferred embodiment, the overall polymer content of the water-in-water polymer dispersions according to the invention is at least 20 wt.-%, more preferably at least 30 wt.-%, still more preferably at least 35 wt.-%, yet more preferably at least 40 wt.-%, most preferably within the range of from 45 wt.-% to 65 wt.-% and in particular from 50 wt.-% to 60 wt.-%, based on the total weight of the water-in-water polymer dispersions. In another preferred embodiment, the overall polymer content of the water-in-water polymer dispersions according to the invention is at least 10 wt.-%, more preferably at least 15 wt.-%, still more preferably at least 20 wt.-%, yet more preferably at least 25 wt.-%, most preferably within the range of from 25 wt.-% to 45 wt.-% and in particular from 30 wt.-% to 40 wt.-%, based on the total weight of the water-in-water polymer dispersions.

In a particularly preferred embodiment, the overall polymer content of the water-in-water polymer dispersions according to the invention is close to the saturation limit, i.e. close to the limiting concentration beyond which no further polymer may be dispersed (at ambient conditions and without adding further emulsifiers). Preferably, the overall polymer content of the water-in-water polymer dispersion is at least 50% of said limiting concentration, more preferably at least 60%, still more preferably at least 70%, yet more preferably at least 80%, most preferably at least 85% and in particular at least 90% of said limiting concentration. The skilled person knows how to determine the limiting concentration of a water-in-water polymer dispersion at ambient conditions.

Thus, in other words, the water content of the water-in-water polymer dispersions is preferably close to the saturation limit. The water-in-water polymer dispersions according to the invention can be commercialized as stable concentrates that are diluted prior to the individual application. The provision as concentrates reduces shipping costs and improves handling performance. It has been surprisingly found that the in situ polymerization of the monomers forming the cross-linked cationic copolymer in the presence of the cationic polymeric dispersant can be conducted at comparatively high monomer concentrations (i.e., at a comparatively low water content) and thus, a highly concentrated water-in-water polymer dispersion is obtained without requiring concentration steps, such as evaporating substantial amounts of excessive water under vacuum at elevated temperature.

Optionally, the water-in-water polymer dispersions according to the invention may contain further conventional components, e.g. in the form of water-soluble or oil-soluble acids and/or salts. The acid is preferably present in amounts of 0.1 to 3 wt. % and the salt in amounts of 0.1 to 3 wt. %, each relative to the overall dispersion, and acid and salt taken together are preferably present in amounts of 5 wt. % at most, preferably 4 wt. % at most, relative to the total weight of the dispersion.

Preferably, the water-in-water polymer dispersion according to the invention contains 0.5 to 5.0 wt.-% of at least one acid and/or 0.5 to 5.0 wt.-% of at least one salt, the overall content of acid and salt amounting to 5.0 wt.-%, based on the total weight of the dispersion.

Said further conventional components can be added before, during or after polymerization.

Preferably, the electrical conductivity of the water-in-water polymer dispersion according to the invention at 20° C. is at least $1.0\,\Omega^{-1}\,m^{-1}$, more preferably at least $2.5\,\Omega^{-1}\,m^{-1}$, still more preferably at least $5.0\,\Omega^{-1}\,m^{-1}$, yet more preferably within the range of from 5.0 to $80\,\Omega^{-1}\,m^{-1}$, most preferably within the range of from 7.5 to $70\,\Omega^{-1}\,m^{-1}$, and in particular within the range of from 10 to $60\,\Omega^{-1}\,m^{-1}$.

Furthermore, the water-in-water polymer dispersions according to the invention may contain water-soluble polyfunctional alcohols and/or reaction products thereof with fatty amines in amounts of up to 30 wt. %, preferably up to 15 wt. %, and more preferably up to 10 wt. %, relative to the cationic polymeric dispersant. More specifically suitable in this context are polyalkylene glycols, preferably polyethylene glycols, polypropylene glycols, block copolymers of propylene/ethylene oxides, with molecular weights of 50 to 50,000, preferably 1,500 to 30,000, low-molecular weight polyfunctional alcohols such as glycerol, ethylene glycol, propylene glycol, pentaerythritol and/or sorbitol as polyfunctional water-soluble alcohols and/or the reaction products thereof with fatty amines having $C_6$-$C_{22}$ in the alkyl or alkylene residues.

Said water-soluble polyfunctional alcohols and/or reaction products thereof with fatty amines can be added before, during or after polymerization.

The water-in-water polymer dispersions according to the invention are storage stable, i.e. no substantial sedimentation of the ingredients is observed upon storage under ambient conditions for several days. As sedimentation causes a change of the haze value of the water-in-water polymer dispersion, storage stability may be expressed in terms of a decrease of the haze value upon storage. Suitable optical methods to measure the haze value are known to the person of ordinary skill. Preferably, the haze value of the water-in-water polymer dispersion does not change more than 25%, more preferably not more than 20%, still more preferably not more than 15%, yet more preferably more than 10%, most preferably not more than 7.5% and in particular not more than 5% after storage for 28 days under ambient conditions.

Preferably, the water-in-water polymer dispersions according to the invention are acidic, i.e. have a pH value below 7.0, more preferably below 6.5, still more preferably below 6.0, yet more preferably below 5.5, most preferably below 5.0 and in particular below 4.5.

The water-in-water polymer dispersions according to the invention have several advantages over conventional water-in-water polymer dispersions, e.g.:
- cross-linked cationic copolymers having a higher molecular weight may be obtained resulting inter alia in improved rheological properties of the water-in-water polymer dispersions;
- product viscosities and salt resistance are extremely high—these properties are particularly desirable for enhanced oil recovery or at paper machines with closed water circuit; products having high product viscosities show a decreased tendency for layering;
- the molar ratio of ionic monomers to non-ionic monomers in the cationic polymeric dispersant and/or in the cross-linked cationic copolymer may be varied within broad limits without significantly deteriorating the essential properties of the water-in-water polymer dispersions;
- the chemistry of the cationic polymeric dispersant is substantially independent from the chemistry of the cross-linked cationic copolymer; and
- the advantageous properties of the water-in-water polymer dispersions are maintained under shear conditions.

The water-in-water polymer dispersions according to the invention are useful as additives in solid/liquid separation processes, e.g., as flocculants in the sedimentation, flotation or filtration of solids; as thickeners; or as a retention agents or drainage aid, e.g., in papermaking/retention in paper; or in sludge dewatering in sewage plants or oil-recovery. They show improved application performance, especially regarding ash retention in paper retention and dewatering, particularly under shear conditions. The water-in-water polymer dispersions obtainable according to the invention have the unexpected advantage of being excellent auxiliaries in paper making, particularly useful as retention and dewatering agents in paper making.

A further aspect of the invention relates to the use of the water-in-water polymer dispersion according to the invention as flocculant (flocculating agent), preferably in the manufacture of paper, preferably as retention aid and/or drainage aid, or as thickener or in oil-recovery, or as a contaminant control or as a dry strength aid.

In this regard, "contaminant control" preferably refers to contaminants that typically occur in paper manufacturing including pulp and papermaking operation, such as machine stock control, e.g. organic contaminant control and inorganic scale control; press section optimization, e.g. press roll contaminant control, press roll adhesion control, press fabric conditioning/cleaning or press fabric passivation; dryer section passivation, e.g. dryer cylinder contaminant control or dryer fabric contaminant control.

In this regard, "dry strength aid" preferably also refers to paper technology.

A further aspect of the invention relates to a process for the manufacture of paper, paperboard or cardboard, the process comprising the step of (ii) adding the water-in-water polymer dispersion according to the invention to an aqueous cellulosic suspension. Preferably, the process further comprises the step of (i) adding a further cationic polymeric dispersant to the cellulosic suspension, wherein step (i) is preferably performed prior to step (ii).

Preferably, the process according to the invention is performed on a paper machine having a closed water circuit. It has been surprisingly found that the high salt resistance of the water-in-water polymer dispersions according to the invention is particularly advantageous when the process water of the machine is recycled, e.g. for economical and/or ecological reasons. Thus, when the recycled water already contains a certain amount of salt, this does not immediately cause precipitation of the polymer from the water-in-water polymer dispersion.

The salt capacity of the water-in-water polymer dispersion is sufficiently high so that the process water may be recycled repeatedly without significantly deteriorating the performance of the water-in-water polymer dispersion according to the invention.

Preferably, the process for the manufacture of paper comprises forming a cellulosic suspension, flocculating the suspension, optionally mechanically shearing the suspension and optionally reflocculating the suspension, draining the suspension on a screen to form a sheet and then drying the sheet, wherein the suspension is flocculated and/or re-flocculated by introducing the water-in-water polymer dispersion according to the invention.

It has surprisingly been found that the water-in-water polymer dispersions according to the invention provide improved performance in terms of improved retention, particularly under shear conditions, and yet still maintain good drainage and formation performance. The water-in-water polymer dispersions flocculate the cellulosic fibers and other components of the cellulosic paper making stock more efficiently thus inducing improvements in retention.

In the process for the manufacture of paper according to the invention the water-in-water polymer dispersion may be added to the paper making stock as the sole treatment agent in the paper making process, although preferably the water-in-water polymer dispersion may be added as part of a multi-component flocculant system in which the cellulosic suspension is flocculated and then reflocculated.

In one aspect of the invention the cellulosic suspension is flocculated by the water-in-water polymer dispersion (flocculating agent) and then the cellulosic suspension is reflocculated by a further addition of the water-in-water polymer dispersion (reflocculating agent) or alternatively, by another flocculating material (reflocculating agent). Optionally, the floccs formed are degraded before being reflocculated, by for instance applying mechanical shear. This can be for instance passing the flocculated cellulosic suspension through one or more shear stages such as a centri-screen or a fan pump etc.

In an alternative form of the invention the cellulosic suspension is flocculated by introducing a flocculating material (flocculating agent) and the cellulosic suspension is reflocculated by introducing the water-in-water polymer dispersion (reflocculating agent). Optionally the floccs are degraded before reflocculation.

The cellulosic suspension may be flocculated by introducing the flocculating agent into the suspension at any suitable addition point. This may be for instance before one of the pumping stages or prior to the centri-screen or even after the centri-screen. The cellulosic suspension may then be reflocculated at any suitable point after it has been flocculated. The flocculating agent and reflocculating agent may be added in close proximity, for example without any shear stage between the additions. Preferably, there is at least one shear stage (preferably selected from cleaning, pumping and mixing stages) separating the addition of flocculating agent and reflocculating agent. Desirably, when the flocculating agent is applied prior to a shear stage, for instance a fan pump or the centri-screen, the reflocculating agent may be added after that shear stage. This may be immediately after the shear stage or more usually further after. Thus, the flocculating agent may be added prior to a fan pump and the reflocculating agent may be added after the centri-screen.

Accordingly, the water-in-water polymer dispersion is added as the flocculating agent and/or as the reflocculating agent.

Desirably, the water-in-water polymer dispersion may be added to the stock at a dose of 5 to 5,000 ppm, more preferably 50 to 2,500 ppm, most preferably 200 to 1,500 ppm, based on solid contents.

When the water-in-water polymer dispersion is used in a paper making process as part of a multi-component flocculating system, it may be added as the flocculating agent and/or reflocculating agent. According to one preferred aspect of the invention the multi-component flocculating system comprises the water-in-water polymer dispersion and a different flocculating material. This flocculating material may be any of the group consisting of water soluble polymers, water insoluble polymeric microbeads, particulate uncooked polysaccharides and inorganic materials. Suitable flocculating materials include inorganic materials such as siliceous materials, alum, aluminium chloro hydrate and polyaluminum chloride.

When the flocculating material is a water soluble polymer, it may be any suitable water soluble polymer, for instance biopolymers, such as nonionic, cationic, anionic and amphoteric starches or other polysaccharides. The flocculating material may also be any suitable cationic, anionic, amphoteric or nonionic synthetic water soluble polymer.

The flocculating material may be a siliceous material which is in the form of an anionic microparticulate composition. The siliceous materials include silica based particles, colloidal silica, silica microgels, silica sols, silica gels, polysilicates, aluminosilicates, borosilicates, polyaluminosilicates, polyborosilicates, zeolites and clays. The clays are preferably swelling clays, for instance this may be typically a bentonite type clay. The preferred clays are swellable in water and include clays which are naturally water swellable or clays which can be modified, for instance by ion exchange to render them water swellable. Suitable water swellable clays include but are not limited to clays often referred to as hectorite, smectites, montmorillonites, nontronites, saponite, sauconite, hormites, attapulgites and sepiolites.

Alternatively, the flocculating material is a colloidal silica, selected from polysilicates and polyaluminosilicates. This includes polyparticulate polysilicic microgels of surface area in excess of 1,000 m$^2$/g, for instance water soluble polyparticulate polyalumino silicate microgels or aluminate polysilicic acid. In addition the flocculating material may be a colloidal silicic acid.

The flocculating material may also be a colloidal borosilicate. The colloidal borosilicate may be prepared by contacting a dilute aqueous solution of an alkali metal silicate with a cation exchange resin to produce a silicic acid and then forming a heel by mixing together a dilute aqueous solution of an alkali metal borate with an alkali metal hydroxide to form an aqueous solution containing 0.01 to 30% $B_2O_3$, having a pH of from 7 to 10.5.

The cellulosic stock suspension may comprise a filler. The filler may be any of the traditionally used filler materials. For instance, the filler may be clay such as kaolin, or the filler may be a calcium carbonate which could be ground calcium carbonate or in particular precipitated calcium carbonate, or it may be preferred to use titanium dioxide as the filler material. Examples of other filler materials also include synthetic polymeric fillers. The paper making stock may comprise any suitable amount of filler. Generally, the cellulosic suspension comprises at least 5% by weight filler material. Typically the amount of filler will be up to 40% or higher, preferably between 10% and 40% filler.

The flocculating material used in conjunction with the water-in-water polymer dispersion, may be an anionic, non-ionic, cationic or amphoteric branched water soluble polymer that has been formed from water soluble ethylenically unsaturated monomer or monomer blend. For instance the branched water soluble polymer may exhibit a) an intrinsic viscosity above 1.5 dl/g and/or saline Brookfield viscosity of above about 2.0 mPa·s.

Alternatively, the flocculating material used in conjunction with the water-in-water polymer dispersion includes cross-linked anionic or amphoteric polymeric micro-particles.

A particularly preferred process employs a multi-component flocculation system comprising as a flocculating agent the water-in-water polymer dispersion and then as a reflocculating agent an anionic flocculating material. The anionic flocculating material includes siliceous materials such as microparticulate silicas, polysilicates, anionic polymeric microbeads and water soluble anionic polymers, including both linear and branched water soluble polymers.

In a particularly preferred embodiment of the process for the manufacture of paper, a further cationic polymeric dispersant is added to the cellulosic suspension, preferably before the water-in-water polymer dispersion is introduced, i.e. the feed point of said further cationic polymeric dispersant is preferably located "upstream" on the paper machine with respect to the feed point of the water-in-water polymer dispersion. The feed point of the further cationic polymeric dispersant may be for instance before one of the pumping stages or prior to the centri-screen. The further cationic polymeric dispersant and the water-in-water polymer dispersion may be added in close proximity, for example without any shear stage between the additions.

Said further dispersant may be identical in structure and/or molecular weight distribution with the cationic polymeric dispersant that is present in the water-in-water polymer dispersion and in the presence of which the in situ polymerization reaction is performed. Preferably, however, said further cationic polymeric dispersant differs from the cationic polymeric dispersant that is present in the water-in-water polymer dispersion. The preferred embodiments of the cationic polymeric dispersant described above in connection with the water-in-water polymer dispersion also apply to said further cationic polymeric dispersant that is preferably additionally employed in the process for the manufacture of paper.

Preferably, the further cationic polymeric dispersant is derived (synthesized) from
- 30 to 100 wt. % of (alk)acrylamidoalkyltrialkyl ammonium halides, (alk)acryloyloxyalkyl trialkyl ammonium halides, alkenyl trialkyl ammonium halides and/or dialkenyl dialkyl ammonium halides; and 0 to 70 wt. % of nonionic co-monomers; or
- a copolymerizate of epichlorohydrin and dialkylamine.

It has been surprisingly found that when employing the water-in-water polymer dispersion according to the invention as a flocculating agent in a dual flocculating system, excellent retention and drainage performance, respectively, can be combined with good formation. Usually, retention/drainage performance and formation performance antagonize one another, but surprisingly, the properties of the water-in-water polymer dispersions according to the invention are advantageous in both regards. The water-in-water polymer dispersions show a significantly improved ash retention, which is a well established measure for retention and drainage performance.

EXAMPLES

The following examples further illustrate the invention but are not to be construed as limiting its scope.

Preparation of the Cationic Dispersant Polymer (Homo DIMAPA Quat.)

At first, 628 g water, 1375 g DIMAPA quat. (60 wt %) and 10 g sulfuric acid (50 wt %) were weighed in a 3 L vessel. Then the monomer solution was sparked with nitrogen for 30 min by stirring. Subsequently, the aqueous solution was heated up to 65° C. and mercaptoethanol and VA-044 were added to the solution. After reaching $t_{max}$ an additional portion of initiator was given to the product for residual monomer burn out. Now the product was stirred for 2 h at 85° C. After that the final aqueous product was cooled down to 30° C.

Preparation of Aqueous Dispersion

Firstly, 267 g acryl amide (50 wt %), 2 g Versenex 80 (5 wt %), 56 g ADAME quat (80 wt %), 341 g water, 8 g ammonium sulphate, 316 g of the cationic dispersant polymer and various amounts of cross-linker (as 1 wt % solution) were filled into a 2 L glass reaction vessel equipped with an anchor stirrer, thermometer and a torque display and homogenized by stirring. Then the monomer solution was sparked with nitrogen for 30 min by stirring at 200 rpm. Subsequently, the aqueous solution was heated up to 35° C. and the initiator system (redox initiator package) was added into the vessel. After reaching $t_{max}$, 3 g V-50 (10 wt %) was added under stirring in order to reduce the monomer content. After some minutes citric acid was added under stirring and the final product was cooled down to 30° C.

| sample | cross-linker | amount of cross-linker [ppm] | product viscosity* [mPas] | salt viscosity* [mPas] |
| --- | --- | --- | --- | --- |
| standard | — | 0 | 6000 | 240 |
| 1A | triallylamine | 2.5 | 5900 | 260 |
| 2A | triallylamine | 20 | 6200 | 280 |
| 3A | triallylamine | 40 | 6300 | 340 |
| 4A | triallylamine | 60 | 6700 | 410 |
| 1B | PEG-diacrylate | 2.5 | 8500 | 300 |
| 2B | PEG-diacrylate | 5 | 7000 | 350 |
| 3B | PEG-diacrylate | 7.5 | 6400 | 360 |
| 4B | PEG-diacrylate | 10 | 7000 | 340 |
| 1C | N,N'-methylen bisacrylamide | 0 | 10400 | 240 |
| 2C | N,N'-methylen bisacrylamide | 5 | 10200 | 270 |
| 3C | N,N'-methylen bisacrylamide | 7.5 | 10300 | 200 |
| 4C | N,N'-methylen bisacrylamide | 10 | 10600 | 80 |
| 1D | dipentaerythritol pentaacrylate | 2.5 | 8700 | 300 |
| 2D | dipentaerythritol pentaacrylate | 5 | 4900 | 300 |
| 3D | dipentaerythritol pentaacrylate | 7.5 | 6700 | 280 |
| 4D | dipentaerythritol pentaacrylate | 10 | 39600 | 100 |
| 1E | N-hydroxymethyl-acrylamide | 25 | 22600 | 380 |

-continued

| sample | cross-linker | amount of cross-linker [ppm] | product viscosity* [mPas] | salt viscosity* [mPas] |
|---|---|---|---|---|
| 2E | N-hydroxymethyl-acrylamide | 50 | 23000 | 460 |
| 3E | N-hydroxymethyl-acrylamide | 100 | 23200 | 250 |

*measured via Brookfield viscometer

Preparation of High Molecular Weight (HMW) Aqueous Dispersion

Firstly, 190 g acryl amide (50 wt %), 2 g Versenex 80 (5 wt %), 120 g ADAME quat (80 wt %), 310 g water, 10 g ammonium sulphate, 360 g of the cationic dispersant polymer and various amounts of cross-linker (as 1 wt % solution) were filled into a 2 L glass reaction vessel equipped with an anchor stirrer, thermometer and a torque display and homogenized by stirring. Then the monomer solution was sparked with nitrogen for 30 min by stirring at 200 rpm. Subsequently, the aqueous solution was heated up to 35° C. and the initiator system consisting of a redox initiator package and azoiniator was added into the vessel. After reaching $t_{max}$, 4 g V-50 (10 wt %) was added under stirring in order to reduce the monomer content. After some minutes citric acid was added under stirring and the final product was cooled down to 30° C.

| sample | cross-linker | amount of cross-linker [ppm] | product viscosity* [mPas] | salt viscosity* [mPas] |
|---|---|---|---|---|
| high molecular weight polymer dispersion linear | — | 0 | 13900 | 710 |
| 1F | N-hydroxymethylacrylamide | 50 | 10700 | 960 |
| 2F | N-hydroxymethylacrylamide | 100 | 14500 | 1280 |
| 3F | N-hydroxymethylacrylamide | 200 | 11600 | 1280 |
| 1G | PEG-diacrylate | 1 | 11500 | 1140 |
| 2G | PEG-diacrylate | 5 | 14000 | 600 |

Monomers:
DIMAPA quat—acryloyl amidopropyl trimethylammonium chloride
ADAME quat—acryloyl oxyethyl trimethylammonium chloride
Other Ingredients:
Versenex 80—chelator
VA-044—initiator
V-50—initiator Application Example Results on Laboratory Furnish Experiment 1:
Method:
Furnish type: Eucalyptus pulp with 30% GCC and 0.5% starch (0.035-0.040 Substitution grade) added. The furnish was refined to 30 SR°.
The laboratory trials were performed using a DFR 04 from BTG Mütek GmbH.
1000 mL of a 0.3% furnish was mixed by 800 rpm for 5 seconds, when the polymer was added and the furnish sheared for an additional 10 seconds at 1000 rpm. After a 10 seconds further mixing by 500 rpm to settle down, the retention was performed according to the supplier of the device. The results are displayed in FIG. 1 showing the positive impact on the ash retention at 550° C., 500 g/t polymer on the ash retention for 1B and 2D (see above) compare to the standard product.

Figure 2:
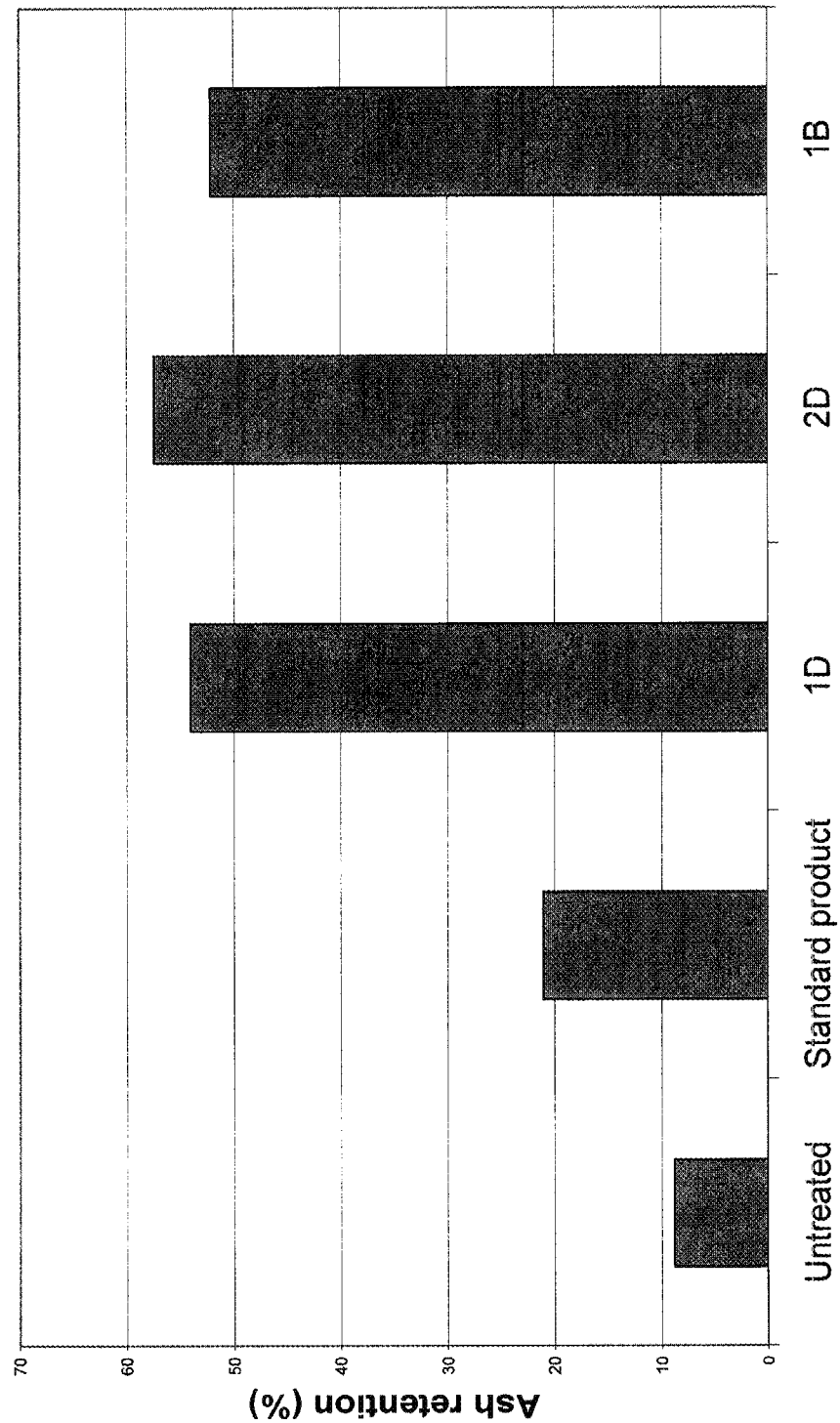
FIG. 2 shows the effect of the polymer dispersions according to the invention on the ash retention in an eucalyptus furnish with the polymer combined with bentonite in a microparticle system.

Experiment 2:
Method:
Furnish type: Eucalyptus pulp with 30% GCC and 0.5% starch (0.035-0.040 Substitution grade) added. The furnish was refined to 30 SR°.
The laboratory trials were performed using a DFR 04 from BTG Mütek GmbH.
1000 mL of a 0.3% furnish was mixed by 800 rpm for 5 seconds, when the polymer was added and the furnish sheared for an additional 10 seconds at 1000 rpm. Bentonite was added and the mixing continued for 10 seconds at 500 rpm and the retention was performed according to the supplier of the device. FIG. 2 shows the positive impact on the ash retention at 550° C., 1000 ppm polymer on the ash retention for 1B, 1D and 2D (see above) in combination with bentonite 4 kg/t compared to the standard product.

Figure 3:
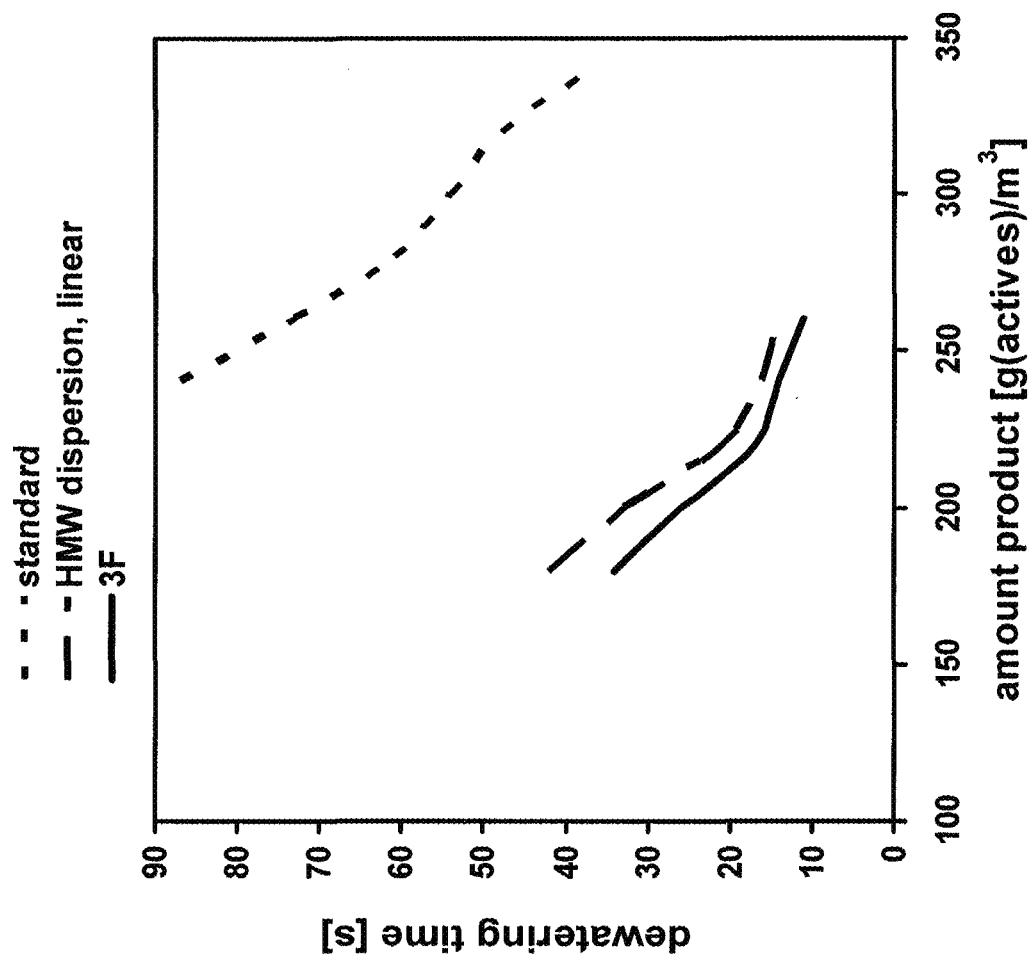
FIG. 3 shows the better dewatering performance of 3F (less product necessary for the same dewatering performance) compared to the high molecular weight polymer dispersion, linear (i.e. non cross-linked) and the standard.

Experiment 3:
Method:
Sludge dewatering test under shear: digested sludge with 3.3 wt % dry solid
500±10 ml of digested sludge (conditioned via agitation) are given into the vessel and the corresponding amount of a 0.1 wt % active solid based solution of the product (sheared with an Ultra Turrax T 25 N, 24000 rpm for 60±0.5 s) is added. The sludge with product (mixed at 1000±20 rpm for 10±0.5 s) is given onto the dewatering sieve (200 µm) and the filtration time for 200 ml filtrate is determined. Afterwards the clarity of the filtrate is determined via a clarity wedge. FIG. 3 shows the better dewatering performance of 3F (less product necessary for the same dewatering performance) compared to the high molecular weight polymer dispersion, linear (i.e. non cross-linked) and the standard.

Figure 4:
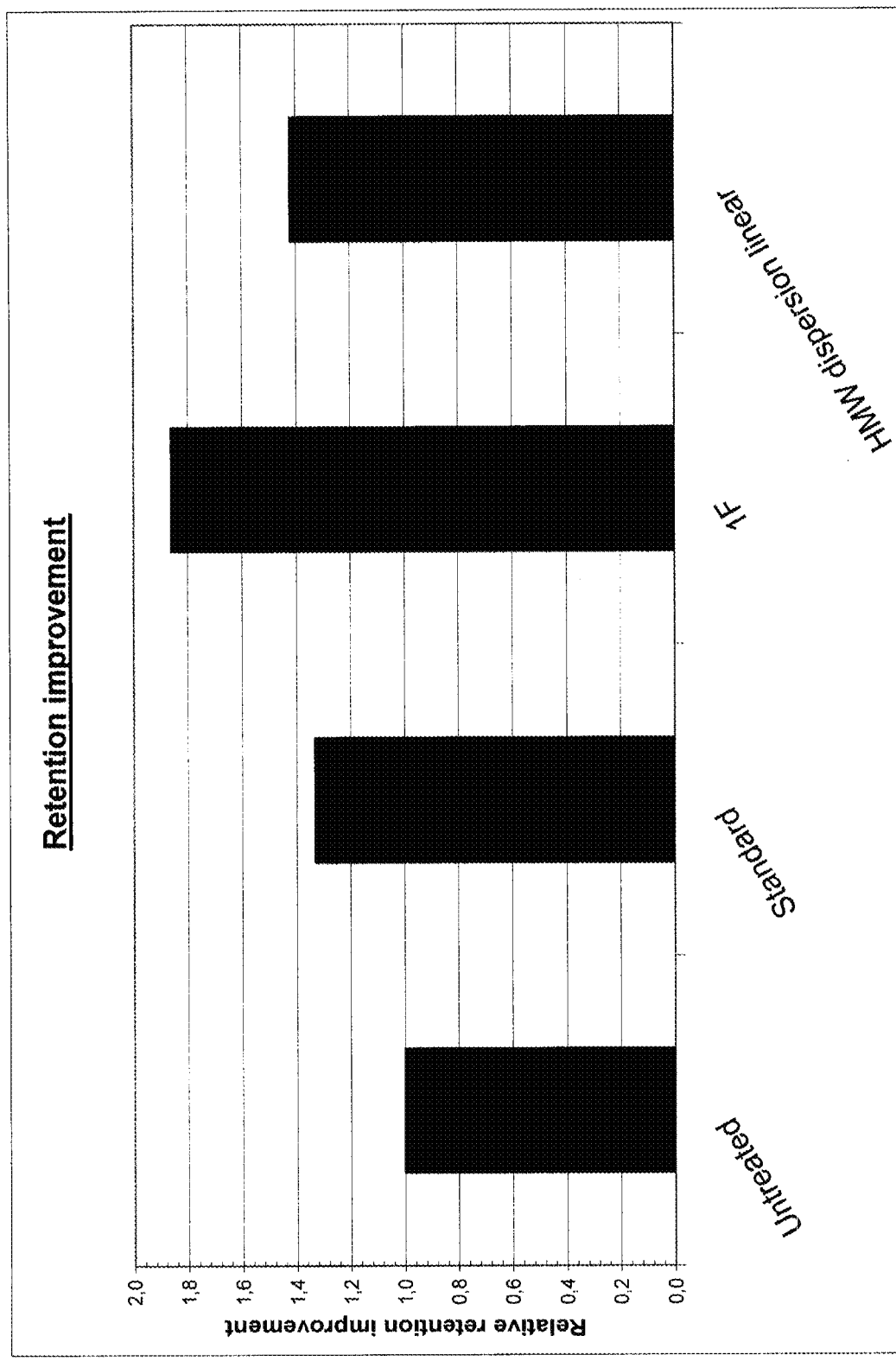
FIG. 4 shows an even more positive impact relatively on the retention; 1000 g/t sol mer for 1F over Standard product and dispersion containing linear, non-cross-linked high molecular weight polymer.

Experiment 4:
Method:
Furnish type: Kraft pulp 50:50 short:long fibre with 30% GCC and 0.5% starch (0.035-0.040 substitution grade) added. The furnish was refined to 30 SR°. The laboratory trials were performed using a DFR 04 from BTG Mütek GmbH. 1000 mL of a 0.3% furnish was mixed by 800 rpm for 5 seconds, when the polymer was added and the furnish sheared for an additional 10 seconds at 1000 rpm. After a 10 seconds further mixing by 500 rpm to settle down, the retention was performed according to the supplier of the device. The results are displayed in FIG. 4 showing an even more positive impact relatively on the retention; 1000 g/t polymer for 1F over Standard product and dispersion containing linear, non-cross-linked high molecular weight polymer.

The invention claimed is:
1. A method for manufacturing a water-in-water polymer dispersion, the method comprising:

free radical polymerizing an aqueous reaction mixture comprising
(i) a cationic polymeric dispersant, and
(ii) a monomer composition comprising
(ii-a) at least 5 wt.-% of a non-ionic monomer of formula (I)

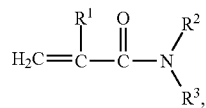 (I)

wherein
$R^1$ means hydrogen or $C_1$-$C_3$-alkyl, and
$R^2$ and $R^3$ mean, independently of each other, hydrogen, $C_1$-$C_5$-alkyl or $C_1$-$C_5$-hydroxyalkyl,
based on a total weight of monomers;
(ii-b) at least 5 wt.-% of a cationic monomer according to general formula (II)

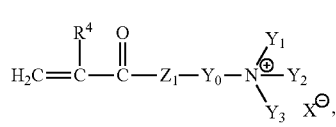 (II)

wherein
$R^4$ means hydrogen or $C_1$-$C_3$-alkyl,
$Z_1$ means O or $NR^5$ with $R^5$ being hydrogen or $C_1$-$C_3$-alkyl,
$Y_0$ means $C_2$-$C_6$-alkylene, optionally substituted with one or more hydroxy groups,
$Y_1$, $Y_2$, $Y_3$, independently of each other, mean $C_1$-$C_6$-alkyl, and
$X^-$ means halogen, pseudo-halogen, acetate, or $SO_4CH_3^-$,
based on the total weight of monomers;
(ii-c) 0.0001 to 1.25 wt.-% of one or more cross-linkers, based on the total weight of monomers;
(ii-d) 0 to 1.25 wt.-% of one or more hydrophobic (meth)acrylic acid $C_{4-18}$-alkyl esters, based on the total weight of monomers; and
(ii-e) optionally, a further ethylenically unsaturated monomer,
before, after, or before and after the free radical polymerizing, adding a water-soluble salt in a quantity of 0.1 to 5.0 wt.-%, based on a total weight of the aqueous reaction mixture, to the aqueous reaction mixture, to obtain a water-in-water polymer dispersion such that the water-in-water polymer dispersion comprises a cross-linked cationic copolymer.

2. The method of claim 1, wherein the aqueous reaction mixture does not comprise any hydrophobic monomers.

3. The method of claim 1, wherein the cross-linker comprises 2, 3, 4, or 5 ethylenically unsaturated groups.

4. The method of claim 1, wherein the non-ionic monomer of formula (I) is selected from the group consisting of (meth)acrylamide, N-methyl(meth)acrylamide, N-isopropyl(meth)acrylamide, N,N-dimethyl(meth)-acrylamide, N,N-diethyl(meth)acrylamide, N-methyl-N-ethyl(meth)acrylamide, and N-hydroxyethyl(meth)acrylamide.

5. The method of claim 1, wherein the cationic monomer of formula (II) is selected from the group consisting of a trimethylammoniumalkyl(meth)acrylate halide, a trimethylammoniumalkyl(meth)acrylamide halide, and a diallyldialkylammonium halide.

6. The method of claim 1, wherein the cationic polymeric dispersant is a water-soluble polymer having a weight average molecular weight $M_w$ of at most $2.0\times10^6$ g/mol.

7. The method of claim 1, wherein the cationic polymeric dispersant is a cationic polymer derived from at least one second cationic monomer selected from the group consisting of a trimethylammoniumalkyl(meth)acrylate halide, a trimethylammoniumalkyl(meth)acrylamide halide, and a diallyldialkylammonium halide.

8. The method of claim 7, wherein the at least one second cationic monomer differs from the cationic monomer of formula (II).

9. A water-in-water polymer dispersion, comprising:
(i) a cationic polymeric dispersant; and
(ii) a cross-linked cationic copolymer derived from a monomer composition comprising
(ii-a) at least 5 wt.-% of a non-ionic monomer of formula (I)

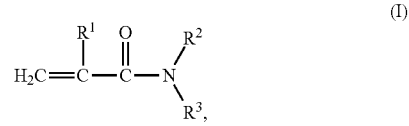 (I)

wherein
$R^1$ means hydrogen or $C_1$-$C_3$-alkyl, and
$R^2$ and $R^3$ mean, independently of each other, hydrogen, $C_1$-$C_5$-alkyl, or $C_1$-$C_5$-hydroxyalkyl,
based on a total weight of monomers;
(ii-b) at least 5 wt.-% of a cationic monomer of formula (II)

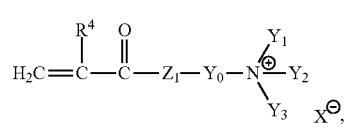 (II)

wherein
$R^4$ means hydrogen or $C_1$-$C_3$-alkyl,
$Z_1$ means O or $NR^5$ with $R^5$ being hydrogen or $C_1$-$C_3$-alkyl,
$Y_0$ means $C_2$-$C_6$-alkylene, optionally substituted with one or more hydroxy groups,
$Y_1$, $Y_2$, $Y_3$, independently of each other, mean $C_1$-$C_6$-alkyl, and
$X^-$ means halogen, pseudo-halogen, acetate, or $SO_4CH_3^-$,
based on the total weight of monomers;
(ii-c) 0.0001 to 1.25 wt.-% of one or more cross-linkers, based on the total weight of monomers;
(ii-d) 0 to 1.25 wt.-% of one or more hydrophobic (meth)acrylic acid $C_{4-18}$-alkyl esters, based on the total weight of monomers;
(ii-e) optionally, a further ethylenically unsaturated monomer, and
(iii) 0.1 to 5.0 wt.-% of at least one selected from the group consisting of an acid and a salt, wherein an overall content of the acid and the salt amounts to a maximum of 5.0 wt.-%, based on a total weight of the dispersion, wherein the salt is present in an amount of from 0.1 wt.-% to 5.0 wt.-%.

10. The dispersion of claim 9, obtained free radical polymerizing the monomer composition in the presence of (i) the cationic polymeric dispersant.

11. The dispersion of claim 9, which has a polymer content of 40±20 based on a total weight of the dispersion.

12. The dispersion of claim 9, where a relative weight ratio of cross-linked cationic copolymer to cationic polymeric dispersant is >1:1.

13. A flocculant,
a thickener,
a contaminant control,
a dry strength aid,
a retention agent, or drainage aid, comprising the dispersion of claim 9.

14. The method of claim 2, wherein the cross-linker comprises 2, 3, 4, or 5 ethylenically unsaturated groups.

15. The method of claim 1, wherein the non-ionic monomer of formula (I) is (meth)acrylamide.

16. The method of claim 1, wherein the non-ionic monomer of formula (I) is N-methyl(meth)acrylamide.

17. The method of claim 1, wherein the non-ionic monomer of formula (I) is N-isopropyl(meth)acrylamide.

18. The method of claim 1, wherein the non-ionic monomer of formula (I) is N,N-dimethyl(meth)-acrylamide.

19. The method of claim 1, wherein the water-soluble salt is a salt of an inorganic acid.

20. The method of claim 1, wherein the water-soluble salt is a salt of a saturated aliphatic organic acid.

21. The method of claim 1, wherein the water-soluble salt is at least one selected from the group consisting of sodium chloride, ammonium sulfate and sodium sulfate.

22. The dispersion of claim 9, wherein the water-soluble salt is a salt of an inorganic acid.

23. The dispersion of claim 9, wherein the water-soluble salt is a salt of a saturated aliphatic organic acid.

24. The dispersion of claim 9, wherein the water-soluble salt is at least one selected from the group consisting of sodium chloride, ammonium sulfate and sodium sulfate.

25. The dispersion of claim 9, wherein the water-soluble salt is at least one salt of an organic acid selected from the group consisting of acetic acid, propionic acid, citric acid, oxalic acid, succinic acid, and malonic acid.

26. The dispersion of claim 9, wherein the water-soluble salt is at least one of an ammonium, sodium, potassium, calcium or magnesium salt of at least one of sulfonic acid, phosphonic acid and a mineral acid.

27. The method of claim 1, wherein the water-in-water polymer dispersion comprises an interpenetrating complex in which a cross-linked cationic copolymer formed by the free radical polymerizing is intercalated in the cationic polymeric dispersant.

28. The water-in-water polymer dispersion of claim 9, wherein the cross-linked cationic copolymer is intercalated with the cationic polymeric dispersant to form an interpenetrating complex.

29. The method of claim 1, wherein the water-soluble salt is at least one salt of an organic acid selected from the group consisting of acetic acid, propionic acid, citric acid, oxalic acid, succinic acid, and malonic acid.

30. The method of claim 1, wherein the water-soluble salt is at least one of an ammonium, sodium, potassium, calcium or magnesium salt of at least one of sulfonic acid, phosphonic acid and a mineral acid.

* * * * *